(12) United States Patent
Tan et al.

(10) Patent No.: US 12,011,972 B2
(45) Date of Patent: Jun. 18, 2024

(54) FLAT-TUBE INTERMEDIATE HEAT EXCHANGER AND THERMAL MANAGEMENT SYSTEM

(71) Applicant: Sanhua Holding Group, Co., Ltd., Hangzhou (CN)

(72) Inventors: Yongxiang Tan, Zhejiang (CN); Yunpeng Wang, Zhejiang (CN); Fengyan Xu, Zhejiang (CN)

(73) Assignee: Sanhua Holding Group, Co., Ltd., Hangzhou (CN)

(*) Notice: Subject to any disclaimer, the term of this patent is extended or adjusted under 35 U.S.C. 154(b) by 614 days.

(21) Appl. No.: 17/100,703

(22) Filed: Nov. 20, 2020

(65) Prior Publication Data

US 2021/0078383 A1 Mar. 18, 2021

Related U.S. Application Data

(63) Continuation of application No. PCT/CN2019/087370, filed on May 17, 2019.

(30) Foreign Application Priority Data

May 23, 2018 (CN) .......................... 201810498122.6
May 23, 2018 (CN) .......................... 201810498123.0
May 28, 2018 (CN) .......................... 201810520391.8

(51) Int. Cl.
*B60H 1/00* (2006.01)
*B60H 1/32* (2006.01)
*F25B 13/00* (2006.01)

(52) U.S. Cl.
CPC ........... *B60H 1/00814* (2013.01); *B60H 1/32* (2013.01); *F25B 13/00* (2013.01)

(58) Field of Classification Search
CPC ........ B60H 1/00814; B60H 1/32; F25B 13/00
See application file for complete search history.

(56) References Cited

U.S. PATENT DOCUMENTS 6,293,123 B1    9/2001  Iritani et al.
2004/0079096 A1 4/2004  Itoh et al.
(Continued)

FOREIGN PATENT DOCUMENTS

CN    102745039 A1    10/2012
CN    103256746 A      8/2013
(Continued)

OTHER PUBLICATIONS

Extended European Search Report for European Application No. 19808173.9, dated Feb. 1, 2022.
(Continued)

*Primary Examiner* — Henry T Crenshaw
(74) *Attorney, Agent, or Firm* — Wolf, Greenfield & Sacks, P.C.

(57) ABSTRACT

A thermal management system includes a compressor, a first throttling device, a flow rate adjustment portion, a first heat exchanger, a second heat exchanger, a third heat exchanger and an intermediate heat exchanger. The flow rate adjustment portion includes a throttling unit and a valve unit, the intermediate heat exchanger includes a first heat exchange portion and a second heat exchange portion, and the second heat exchange portion includes a first port, a second port and a third port. The first port of the second heat exchange portion is in communication with a refrigerant outlet of the first heat exchanger or a refrigerant inlet of the second heat exchanger by the first throttling device.

20 Claims, 15 Drawing Sheets

(56) References Cited

U.S. PATENT DOCUMENTS

| | | | |
|---|---|---|---|
| 2005/0061488 A1* | 3/2005 | Yu | F28D 1/0443 |
| | | | 165/140 |
| 2010/0147501 A1* | 6/2010 | Art | F28D 1/05391 |
| | | | 165/173 |
| 2012/0011867 A1* | 1/2012 | Koons | F28D 1/0443 |
| | | | 165/165 |
| 2012/0266622 A1 | 10/2012 | Inaba et al. | |
| 2013/0283843 A1* | 10/2013 | Takenaka | F25B 13/00 |
| | | | 62/324.6 |
| 2014/0298837 A1 | 10/2014 | Tanda et al. | |
| 2015/0052913 A1 | 2/2015 | Smith et al. | |
| 2016/0290730 A1* | 10/2016 | Taras | F28F 1/126 |
| 2020/0300513 A1* | 9/2020 | Matsuda | F24F 13/30 |

FOREIGN PATENT DOCUMENTS

| | | |
|---|---|---|
| CN | 104121722 A1 | 10/2014 |
| CN | 107444071 A | 12/2017 |
| JP | 2001-041601 A1 | 2/2001 |
| JP | 2005-233535 A1 | 9/2005 |
| JP | 5194279 B2 | 5/2013 |
| JP | 2017-193212 A | 10/2017 |
| JP | 6394505 B2 | 9/2018 |
| WO | WO 2013/035130 A1 | 3/2015 |

OTHER PUBLICATIONS

International Search Report and Written Opinion for International Application No. PCT/CN2019/087370, dated Aug. 29, 2019.

\* cited by examiner

FLAT-TUBE INTERMEDIATE HEAT EXCHANGER AND THERMAL MANAGEMENT SYSTEM

The present application is a continuation application of international application No. PCT/CN2019/087370, titled "THERMAL MANAGEMENT SYSTEM", filed on May 17, 2019, which claims the benefit of priorities to the following three Chinese patent applications, and the entire disclosures of which are incorporated herein by reference,
1. Chinese patent application No. 201810498122.6, filed with the China National Intellectual Property Administration on May 23, 2018, titled "THERMAL MANAGEMENT SYS TEM";
2. Chinese patent application No. 201810498123.0, filed with the China National Intellectual Property Administration on May 23, 2018, titled "THERMAL MANAGEMENT SYSTEM"; and
3. Chinese patent application No. 201810520391.8, filed with the China National Intellectual Property Administration on May 28, 2018, titled "THERMAL MANAGEMENT SYSTEM".

FIELD

The present application relates to the technical field of thermal management systems.

BACKGROUND

Generally, the thermal management system is provided with an intermediate heat exchanger. However, a technical problem to be solved is how to use the intermediate heat exchanger to improve the performance of the thermal management system.

SUMMARY

An object of the present application is to provide a thermal management system, which is advantageous for improving the performance of the thermal management system.

A thermal management system includes a compressor, a first heat exchanger, a second heat exchanger, a third heat exchanger and an intermediate heat exchanger. The intermediate heat exchanger includes a first heat exchange portion and a second heat exchange portion. The first heat exchange portion can at least exchange heat with the second heat exchange portion, a first end port of the first heat exchange portion is in communication with an inlet of the compressor, a second end port of the first heat exchange portion can communicate with a refrigerant outlet of the second heat exchanger and/or communicate with a second end port of the third heat exchanger. A first end port of the second heat exchange portion can communicate with a refrigerant outlet of the first heat exchanger or communicate with a refrigerant inlet of the second heat exchanger. The thermal management system further includes a flow regulating portion, which includes a throttling unit and a valve unit. A first end port of the third heat exchanger can communicate with a third end port of the second heat exchange portion through the valve unit, and a second end port of the second heat exchange portion can communicate with the first end port of the third heat exchanger through the throttling unit. An operation mode of the thermal management system includes a heating mode and/or a first dry mode. In at least one of the above operation modes, the throttling unit opens a path between the first end port of the third heat exchanger and the second end port of the second heat exchange portion, or the throttling unit and the valve unit open a path between the first end port of the third heat exchanger and the second end port of the second heat exchange portion, the valve unit shuts off a path between the first end port of the third heat exchanger and the third end port of the second heat exchange portion, and a refrigerant flowing through the first heat exchange portion can exchange heat with a refrigerant flowing through a part of the second heat exchange portion.

A thermal management system includes an intermediate heat exchanger. The intermediate heat exchanger includes a first heat exchange portion and a second heat exchange portion. The second heat exchange portion includes multiple first flat tubes, a first collecting pipe and a second collecting pipe. A chamber of the second collecting pipe includes a first sub-chamber and a second sub-chamber, and the first sub-chamber is relatively not in communication with the second sub-chamber. In the multiple first flat tubes, a part of the first flat tubes form a first sub-portion, and the other parts of the first flat tubes form a second sub-portion. The first sub-chamber can communicate with a chamber of the first collecting pipe through a passageway of the first sub-portion, and the second sub-chamber can communicate with the chamber of the first collecting pipe through a passageway of the second sub-portion. The first heat exchange portion includes multiple second flat tubes, a third collecting pipe and a fourth collecting pipe. A chamber of the third collecting pipe can communicate with a chamber of the fourth collecting pipe through a passageway of the second flat tube. Each of the first flat tubes includes a first bonding portion, each of the second flat tubes includes a second bonding portion, and the first bonding portion is in direct or indirect connection with the second bonding portion. The first end port of the second heat exchange portion is in communication with the first sub-chamber, and the second end port of the second heat exchange portion is in communication with the chamber of the first collecting pipe, the third end port of the second heat exchange portion is in communication with the second sub-chamber, the first end port of the first heat exchange portion is in communication with the chamber of the third collecting pipe, and the second end port of the first heat exchange portion is in communication with the chamber of the fourth collecting pipe. The thermal management system further includes a compressor, a first heat exchanger, a second heat exchanger, a third heat exchanger and a first throttling device. The first throttling device is provided at a refrigerant inlet of the second heat exchanger. The first end port of the first heat exchange portion is in communication with an inlet of the compressor, the second end port of the first heat exchange portion can communicate with a refrigerant outlet of the second heat exchanger, and the first end port of the second heat exchange portion can communicate with the refrigerant outlet of the first heat exchanger or communicate with the refrigerant inlet of the second heat exchanger through the first throttling device. The thermal management system further includes a flow regulating portion which includes a throttling unit and a valve unit. The second end port of the second heat exchange portion can communicate with the first end port of the third heat exchanger through the throttling unit, and the first end port of the third heat exchanger can communicate with the third end port of the second heat exchange portion through the valve unit.

A thermal management system includes a compressor, a first heat exchanger, a second heat exchanger, a third heat exchanger and an intermediate heat exchanger. The intermediate heat exchanger includes a first heat exchange portion and a second heat exchange portion. The first heat exchange portion can exchange heat with at least a part of the second heat exchange portion, a first end port of the first heat exchange portion is in communication with an inlet of the compressor, a second end port of the first heat exchange portion can communicate with a refrigerant outlet of the second heat exchanger and/or communicate with a second end port of the third heat exchanger. A first end port of the second heat exchange portion can communicate with a refrigerant outlet of the first heat exchanger or communicate with a refrigerant inlet of the second heat exchanger. The thermal management system further includes a fluid control device. The first end port of the third heat exchanger can communicate with the second end port of the second heat exchange portion through the fluid control device, or the first end port of the third heat exchanger can also communicate with the third end port of the second heat exchange portion through the fluid control device. In the case that the first end port of the third heat exchanger is in communication with the second end port of the second heat exchange portion, the first heat exchange portion can exchange heat with a part of the second heat exchange portion. In the case that the first end port of the third heat exchanger is in communication with the third end port of the second heat exchange portion, the first heat exchange portion can exchange heat with the whole second heat exchange portion. An operation mode of the thermal management system includes a heating mode, a refrigerating mode and a first dry mode and a second dry mode. In at least one of the above operation modes, the first end port of the third heat exchanger can choose to communicate with the second end port of the second heat exchange portion or communicate with the third end port of the second heat exchange portion through the fluid control device.

The thermal management system is provided with the intermediate heat exchanger. The first heat exchange portion of the intermediate heat exchanger includes the first end port, the second end port and the third end port. In at least one of the above operation modes, a refrigerant flowing through the first heat exchange portion exchanges heat with a part of the refrigerant flowing through the second heat exchange portion, so as to meet the heat exchange amount of the intermediate heat exchanger required by the thermal management system, which is conducive to relatively improving the performance of the thermal management system.

DETAILED DESCRIPTION OF THE EMBODIMENTS

Figure 1:
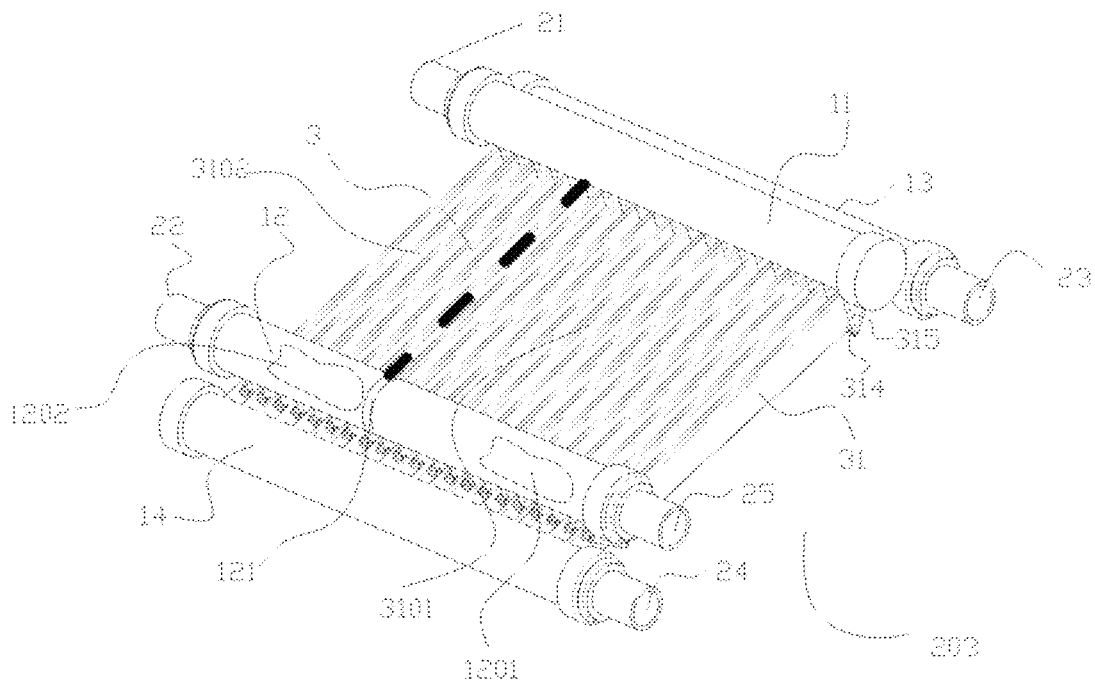
FIG. 1 is a schematic structural view of an intermediate heat exchanger according to a technical solution of the present application.

A thermal management system according to the technical solution of the present application has a variety of embodiments, at least one of which can be applied to a vehicle thermal management system, and at least one of which can be applied to other thermal management systems such as a home thermal management system or a commercial thermal management system. A vehicle thermal management system is particularly described with reference to the drawings hereinafter.

Referring to FIG. 8 to FIG. 18, the thermal management system includes a compressor 10, a first heat exchanger 101, a second heat exchanger 102, a third heat exchanger 103, a first throttling device 202, and an intermediate heat exchanger 203. An outlet of the compressor 10 is in communication with a refrigerant inlet of the first heat exchanger 101, and the first throttling device 202 is provided at a refrigerant inlet of the second heat exchanger 102 and is configured to throttle the refrigerant entering the second heat exchanger 102. The intermediate heat exchanger 203 includes a first heat exchange portion 20 and a second heat exchange portion 30, and each of the first heat exchanger portion and the second heat exchange portion 30 includes a refrigerant passageway. When the thermal management system works, the refrigerant flowing through the first heat exchange portion 20 can exchange heat with the refrigerant flowing through the second heat exchange portion 30. Specifically, referring to FIG. 1, the second heat exchange portion 30 includes a first end port 25, a second end port 21 and a third end port 22. In a case that the refrigerant flows through refrigerant passageways between the first end port 25 of the second heat exchange portion 30 and the second end port 21 of the second heat exchange portion 30, the refrigerant flows through only a part of the refrigerant passageways of the second heat exchange portion 30, therefore, the refrigerant flowing through the first heat exchange portion 20 can exchange heat with the refrigerant in a part of the second heat exchange portion 30. In a case that the refrigerant flows through refrigerant passageways between the first end port 25 of the second heat exchange portion 30 and the third end port 22 of the second heat exchange portion 30, the refrigerant flows through all the refrigerant passageways of the second heat exchange portion 30, and the refrigerant flowing through the second heat exchange portion 30 exchanges heat with the refrigerant flowing through the first heat exchange portion 20. The third end port 22 of the second heat exchange portion 30 can communicate with the first end port of the third heat exchanger 103, the second end port 21 of the second heat exchange portion 30 can also communicate with the first end port of the third heat exchanger 103, and the first end port 25 of the second heat exchange portion 30 can communicate with a refrigerant outlet of the first heat exchanger 101. The first end port 23 of the first heat exchange portion 20 is in communication with an inlet of the compressor 10, and the second end port 24 of the first heat exchange portion 20 can communicate with the refrigerant outlet of the second heat exchanger 102 and/or communicate with the second end port of the third heat exchanger 103.

The intermediate heat exchanger 203 may be a plate-type heat exchanger, a micro-channel heat exchanger or a pipe-type heat exchanger. The micro-channel heat exchanger is taken as an example for introducing the intermediate heat exchanger 203 hereinafter. Referring to FIG. 1 to FIG. 7, the intermediate heat exchanger 203 includes a first collecting pipe 11, a second collecting pipe 12, a third collecting pipe 13, a fourth collecting pipe 14 and multiple heat exchange assemblies 3. The first collecting pipe 11 and the third collecting pipe 13 are located at a side of the multiple heat exchange assemblies 3, and the second collecting pipe 12 and the fourth collecting pipe 14 are located at the other opposite side of the multiple heat exchange assemblies 3. Each heat exchange assembly 3 includes a first flat tube 31 and a second flat tube 32. The intermediate heat exchanger 203 includes the first heat exchange portion 20 and the second heat exchange portion 30, wherein the second heat exchange portion 30 includes the first collecting pipe 11, the second collecting pipe 12 and the first flat tubes 31, and the first heat exchange portion 20 includes the third collecting pipe 13, the fourth collecting pipe 14 and the second flat tubes 32. The first collecting pipe 11 includes a first chamber and the second end port 21, and the first chamber is in communication with the second end port 21. Specifically, the first collecting pipe 11 includes a longitudinally long tubular first main body portion with two first ends closed by first end covers, respectively. The first main body portion and the first end covers together define the first chamber. The second end port 21 is arranged at the first main body portion, or the second end port 21 is arranged at the first end cover, or the second end port 21 is arranged at a communication pipe in communication with the first collecting pipe 11. The first main body portion is further provided with multiple first insertion slots which are parallel to each other and penetrate through a pipe wall of the first main body portion. The second collecting pipe 12 includes the first end port 25, the third end port 22 and a second chamber. The second collecting pipe 12 includes a longitudinally tubular second main body portion, two ends of the second main body portion are closed by second end covers, and the second main body portion and the second end covers together define the second chamber (not shown). The first end port is arranged at an end of the second main body portion, or the first end port 25 is arranged at the second end cover, or the first end port 25 is arranged at the communication pipe in communication with the second collecting pipe 12. The third end port 22 is arranged at the other end of the second main body portion, or the third end port 22 is arranged at the second end cover of the corresponding end of the second main body portion, or the third end port 22 is arranged at the communication pipe in communication with the second collecting pipe 12. The second main body portion is further provided with multiple second insertion slots (not shown) which are parallel to each other and penetrate through a pipe wall of the second main body portion. Referring to FIG. 1, the second heat exchange portion 30 includes a partition plate 121 fixed to the second collecting pipe 12. In the present embodiment, the partition plate 121 is fixed to the second collecting pipe 12 by brazing. The partition plate 121 divides the second chamber into a first sub-chamber 1201 and a second sub-chamber 1202 which are relatively not in communication with each other. The first sub-chamber 1201 is in communication with the first end port 25 of the second heat exchange portion 30, and the second sub-chamber 1202 is in communication with the third end port 22 of the second heat exchange portion 30. Along an axial direction of the second collecting pipe 12, the two second end covers may be or may not be equidistant from the partition plate 121, and the position of the partition plate 121 depends on the heat exchange amount of the intermediate heat exchanger 203 required by the thermal management system. It is conceivable that the first end port 25 of the second heat exchange portion 30 and the third end port 22 of the second heat exchange portion 30 are located on two opposite sides of the partition plate 121. In other embodiments, the second collecting pipe 12 may include a first sub-pipe and a second sub-pipe, the first sub-pipe includes a first sub-chamber 1201, the second sub-pipe includes a second sub-chamber 1202, and the first sub-pipe and the second sub-pipe may be fixed together or not. The "relatively not in communication" herein refers to that the first sub-chamber 1201 cannot directly communicate with the second sub-chamber 1202 due to the existence of the partition plate 121. Obviously, the first sub-chamber 1201 can communicate with the second sub-chamber 1202 through passageways of a first sub-portion 3101, the first chamber and passageways of a second sub-portion 3102. Structures of the third collecting pipe 13 and the fourth collecting pipe 14 are substantially the same as that of the first collecting pipe 11, which will not be described in detail.

Figure 2:
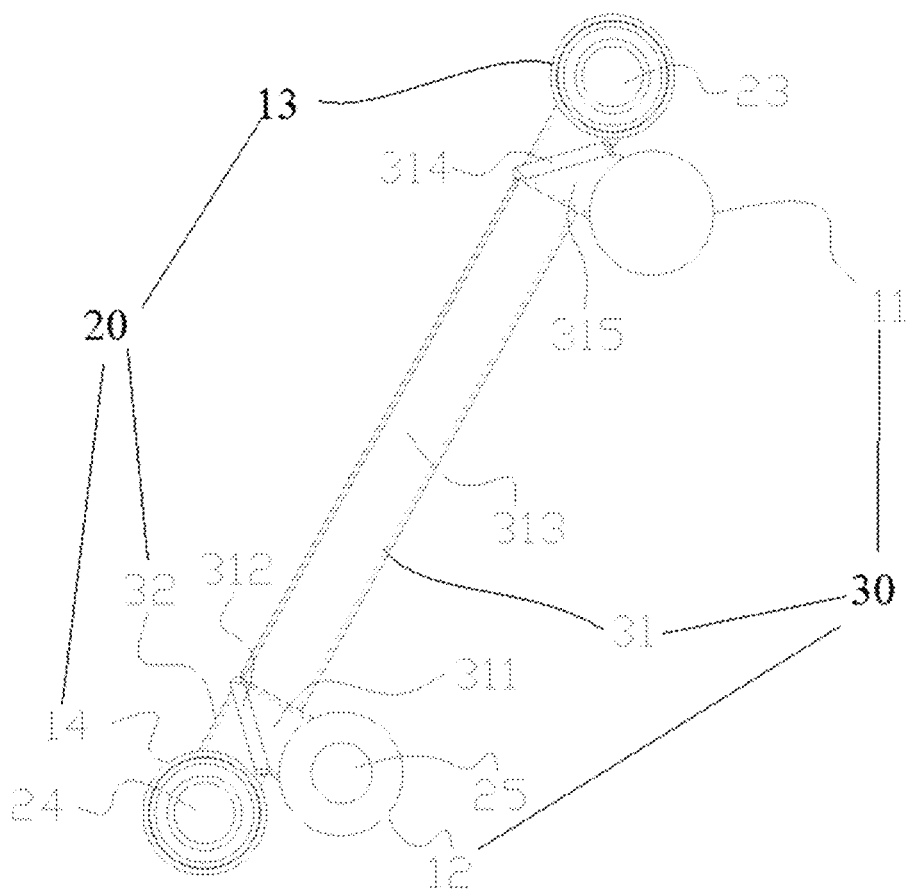
FIG. 2 is a schematic side view showing the structure of the intermediate heat exchanger in FIG. 1.
Figure 3:
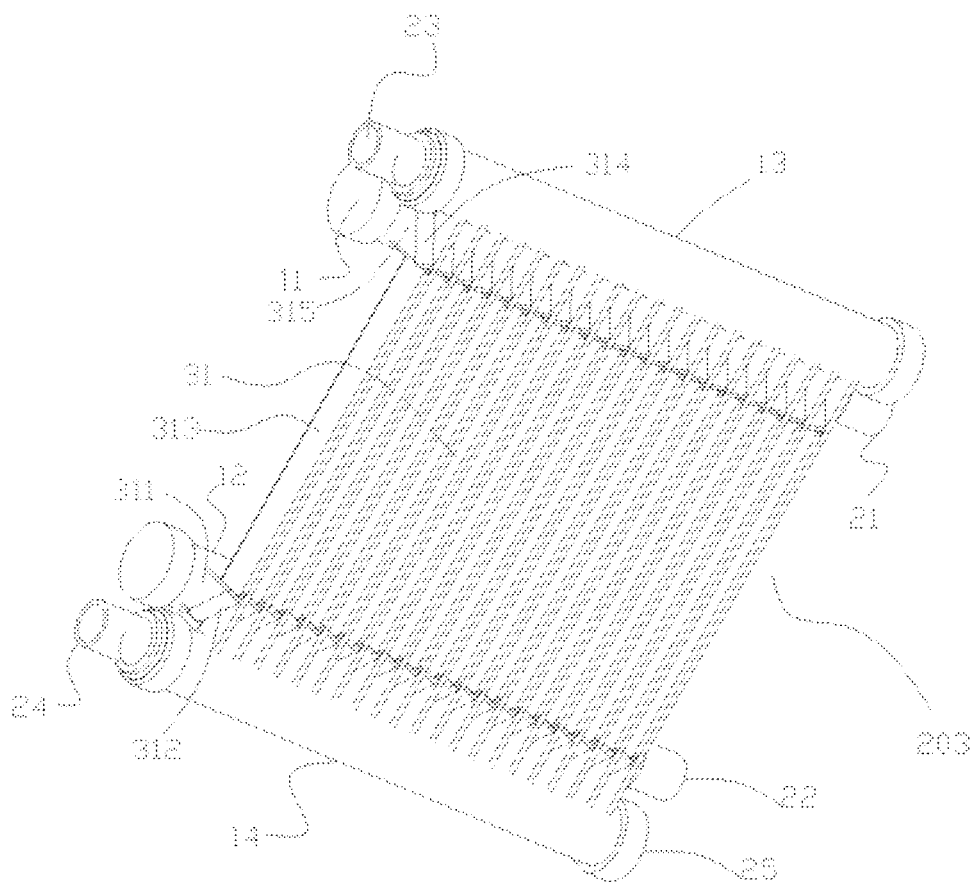
FIG. 3 is a schematic bottom view showing the structure of the intermediate heat exchanger in FIG. 1.

Referring to FIG. 1 and FIG. 2, the second heat exchange portion 30 includes the first flat tubes 31, and the first heat exchange portion 20 includes the second flat tubes 32. Each of the first flat tubes 31 includes a first communication passageway, a first end portion and a second end portion. The first end portion of each first flat tube 31 is fixed to the first insertion slot of the first main body portion by brazing. An end port of the first end portion is in communication with the first chamber, and the first communication passageway is in communication with the first chamber. The second end portion of each first flat tube 31 is fixed to the second insertion slot by brazing. Specifically, the first flat tubes 31 include the first sub-portion 3101 and the second sub-portion 3102, or in other words, the first sub-portion 3101 includes a part of the first flat tubes 31 of the second heat exchange portion 30, and the second sub-portion 3102 includes the other a—part of first flat tubes 31 of the second heat exchange portion 30. End ports of the second end portions of the first flat tubes 31 belonging to the first sub-portion 3101 are in communication with the first sub-chamber 1201, and the end ports of the second end portions of the first flat tubes 31 belonging to the second sub-portion 3102 are in communication with the second sub-chamber 1202. Therefore, the first chamber can communicate with the first sub-chamber 1201 through passageways of the first sub-portion 3101, and the first chamber can also communicate with the second sub-chamber 1202 through passageways of the second sub-portion 3102. Each of the second flat tubes 32 includes a second communication passageway, and each of the second flat tubes 32 includes a third end portion and a fourth end portion. The third end portions are fixed to the first insertion slots of the third collecting pipe 13 by brazing, end ports of the third end portions are in communication with a chamber of the third collecting pipe 13, and then the second communication passageways are in communication with the chamber of the third collecting pipe 13. The fourth end portions are fixed to the first insertion slots of the fourth collecting pipe 14 by brazing, and end ports of the fourth end portions are in communication with a chamber of the fourth collecting pipe 14, and then the second communication passageways are in communication with the chamber of the third collecting pipe 13, and the chamber of the third collecting pipe 13 can communicate with the chamber of the fourth collecting pipe 14 through the second communication passageways. It is conceivable that the first communication passageways are relatively not in communication with the second communication passageways, and the main body portion of the collecting pipe may be a circular pipe, a square pipe or other regular or irregular pipes.

Referring to FIG. 2 to FIG. 7, a part of the first flat tubes 31 are in direct or indirect connection with a part of the second flat tubes 32, and the refrigerant flowing through the first flat tubes 31 can exchange heat with the refrigerant flowing through the second flat tubes 32 at a connecting portion between the first flat tubes and the second flat tubes, or the refrigerant flowing through the first heat exchange portion 20 can exchange heat with the refrigerant flowing through the second heat exchange portion 30 at a connecting portion between the first heat exchange portion 20 and the second heat exchange portion 30. Each of the first flat tubes 31 includes a first bonding portion 313, a first bent portion 312 and a first connecting portion 311. The first bonding portion 313 and the first connecting portion 311 are located on two opposite sides of the first bent portion 312. The refrigerant flowing through the first bonding portion 313 enters the first connecting portion 311 through the first bent portion 312, and then enters the second chamber. The first flat tube 31 is a longitudinally long flat tube, and at least an interval wall is formed along a longitudinal direction of the first flat tube. The interval wall divides the flat tube into multiple first communication passageways which are parallel to each other. The first communication passageways may be circular passageways or other shape passageways arranged in a row and at intervals. The first connecting portion 311 includes the second end portion of the first flat tube 31, or the second end portion of the first flat tube 31 is arranged at the first connecting portion 311. The second end portion of the first flat tube 31 is defined as a portion extending by less than or equal to 3 mm along the first communication passageway from the end port of the second end portion, or in other words, the length of the second end portion is less than or equal to 3 mm along the first communication passageway direction. The first end portion of the first flat tube 31, the third end portion of the second flat tube 32, and the fourth end portion of the second flat tube 32 are defined in the same way. The first bonding portion 313, the first connecting portion 311 and the first bent portion 312 may be integrally formed, or may be split structures and welded as one piece, wherein the first flat tube 31 may be a hollow flat elbow pipe or a flat elbow pipe including multiple passageways. It is conceivable that a bending radius of the first bent portion 312 is less than half of the distance between the adjacent heat exchange assemblies 3, so as to ensure that the adjacent heat exchange assemblies are arranged side by side. The first bonding portion 313 includes two opposite ends each connecting with one said first bent portion 312. The first bent portions 312 are located at two different ends of the first bonding portion 313 extending along a direction closed to each other, and the first connecting portions 311 disposed at two different ends of the first bonding portion 313 are parallel to each other. Each first connecting portion 311 is parallel to the first bonding portion 313, and one first connecting portion 311 aligned to the other first connecting portion 311 extends along the length direction of the first bonding portion 313.

The first bonding portion 313 includes a first surface 3131 and a first bonding surface 3133, the first surface 3131 and the first bonding surface 3133 are arranged on two opposite sides of the first bonding portion 313, the first bonding surface 3133 is in direct or indirect connection with a part of the second flat tube 32, wherein, the direct or indirect connection refers to that the first bonding surface 3133 is in direct or indirect connection with an adjacent surface of the second flat tube 32, the indirect connection refers to that the first bonding surface 3133 is in contact with the second flat tube 32 through an intermediate, the intermediate is generally a thermal conductor, so as to ensure that the refrigerant of the first flat tube 31 can exchange heat with the refrigerant of the second flat tube 32, for example, the intermediate is aluminum foil, the first bonding surface 3133 is in contact and fixed with the aluminum foil, and then the aluminum foil is in contact and fixed with the second flat tube 32. The fixing method may be brazing, bonding or the like. The intermediate may be thermally conductive silicone grease. The first bonding surface 313 is bonded with the adjacent surface of the second flat tube 32 by the thermally conductive silicone grease. Generally, the intermediate does not include air. For the convenience of subsequent description, a center line 3132 of the first surface is defined as follows: along the width direction of the first surface 3131, two edges of the first surface 3131 are equidistant from the center line 3132 of the first surface 3131. Center lines of a second surface 3111 and a first bent surface 3121 are defined in the same way. Similarly, the second flat tube 32 also has the same definition, which will not be described in detail. The first bent portion 312 includes the first bent surface 3121, the first connecting portion 311 includes the second surface 3111, and the first bent surface 3121 extends from one side of the first surface 3131 to the second surface 3111. The first surface 3131 and the second surface 3111 are substantially planar surface, the first bent surface 3121 is substantially curved surface, the first bent surface 3121 is bent relative to the first surface 3131 and/or the first bent surface 3121 is bent relative to the second surface 3111, or in other words, the first bent portion 312 is bent relative to the first bonding portion 313 and/or the first bent portion 312 is bent relative to the first connecting portion 311, and the first bent portion 312 extends from the first bonding portion 313 to the first connecting portion 311. The first bent portion 312 is arc-shaped and folded from the first bonding portion 313 to the first connecting portion, and the first connecting portion 311 is not coplanar with the first bonding portion 313. An included angle is defined between the first bonding portion 313 and the first bent portion 312, and the included angle range is from 0 degree to 90 degrees. A part of the second surface 3111 is opposite to a part of the first surface 3131, the center line 3122 of the first bent surface 3121 tilts relative to the center line 3132 of the first surface and/or the center line 3122 of the first bent surface tilts relative to the center line 3112 of the second surface. In the technical solutions of the present application, the tilt here refers to that an included angle of two center lines is greater than 0 degree and less than 90 degrees. In order to ensure that the first connecting portion 311 is fixed to the first insertion slot of the second collecting pipe 12 by brazing, along a normal direction of the first surface 3131, a projection of the second end portion of the first flat tube 31 on the first surface 3131 is not intersected with a projection of the first bonding portion 313 on the first surface. It is conceivable that an axis of the second collecting pipe 12 is perpendicular to the first surface 3131, and in the normal direction of the first surface 3131, a projection of the second collecting pipe 12 on the first surface 3131 is not intersected with the projection of the first bonding portion 313 on the first surface 3131. In this way, the end portion of the first connecting portion 311 protrudes out of the heat exchange assembly, the end portion of the first connecting portion 311 extends into the second insertion slot of the second collecting pipe 12 and is fixed to the second insertion slot of the second collecting pipe 12 by brazing, and the first communication passageways are in communication with the second chamber. The first flat tube 31 includes a second bent portion 314 and a second connecting portion 315, the first bonding portion 313 and the second connecting portion 315 are located on two opposite sides of the second bent portion 314, respectively. The communication passageway of the first bonding portion 313 is in communication with the communication passageway of the second connecting portion 311 through the communication passageway of the second bent portion 315, or in other words, the fluid flowing through the first bonding portion 313 enters the second connecting portion 315 through the second bent portion 314, and then enters the first chamber. The structure of the second bent portion 314 is substantially the same as that of the first bent portion 312, and the structure of the second connecting portion 315 is substantially the same as that of the first connecting portion 311, which will not be described in detail. The second bent portion 314 includes a second bent surface 3141, and the second connecting portion 315 includes a third surface 3151. The second bent surface 3141 is bent relative to the first surface 3131 and/or the third surface 3151, or in other words, the second bent portion 314 is bent relative to the first bonding portion 313 and/or the second bent portion 314 is bent relative to the second connecting portion 315, or in other words, a center line of the second bent surface 3141 tilts relative to the center line 3132 of the first surface and/or the center line 3152 of the third surface. The second bent surface 3141 extends from the other side of the first surface 3131 to the third surface 3151, the second bent portion 314 extends from the other side of the first bonding portion 313 to the second connecting portion 315, a part of the third surface 3151 is opposite to a part of the first surface 3131, and a part of the second connecting portion 315 is opposite to a part of the first bonding portion 313. In other embodiments, the first flat tube 31 may include a first curved portion (not shown), wherein the first end portion of the first flat tube 31 is provided at the first curved portion, or in other words, the first end portion of the first flat tube 31 is a part of the first curved portion, the first curved portion extends from the first bonding portion 313 and is bent relative to the first bonding portion, the first curved portion includes a first curved surface, the first curved surface extends from the first surface and is bent relative to the center line of the first surface, or in other words, the center line of the first curved surface is a curve, and the first curved surface and the first surface 3131 are substantially in a same plane. Similarly, in order to ensure that the end portion of the second connecting portion 315 or the end portion of the first curved portion is fixed to the first insertion slot of the first collecting pipe 11 by brazing, in the normal direction of the first surface 3131, the projection of the first end portion of the first flat tube 31 on the first surface is not intersected with the projection of the first bonding portion 313 on the first surface. It is conceivable that the axis of the first collecting pipe 11 is perpendicular to the first surface, and in the normal direction of the first surface, the projection of the first collecting pipe 11 on the first surface is not intersected with the projection of the first bonding portion 313 on the first surface. In this way, the first end portion of the first flat tube 31 protrudes out of the heat exchange assembly, and the first end portion of the first flat tube 31 extends into the first insertion slot of the first collecting pipe 11 and is fixed to the first insertion slot of the first collecting pipe 11 by brazing. It is conceivable that the first end portion of the first flat tube 31 is arranged at the second connecting portion 315 or the first curved portion.

Figure 4:
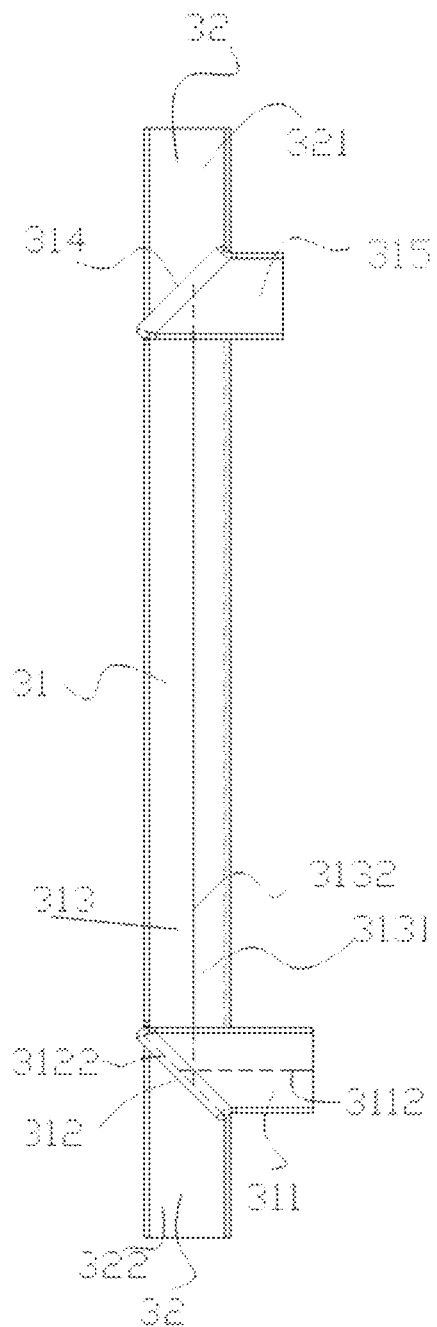
FIG. 4 is a schematic structural view of a heat exchange assembly according to a technical solution of the present application.
Figure 5:
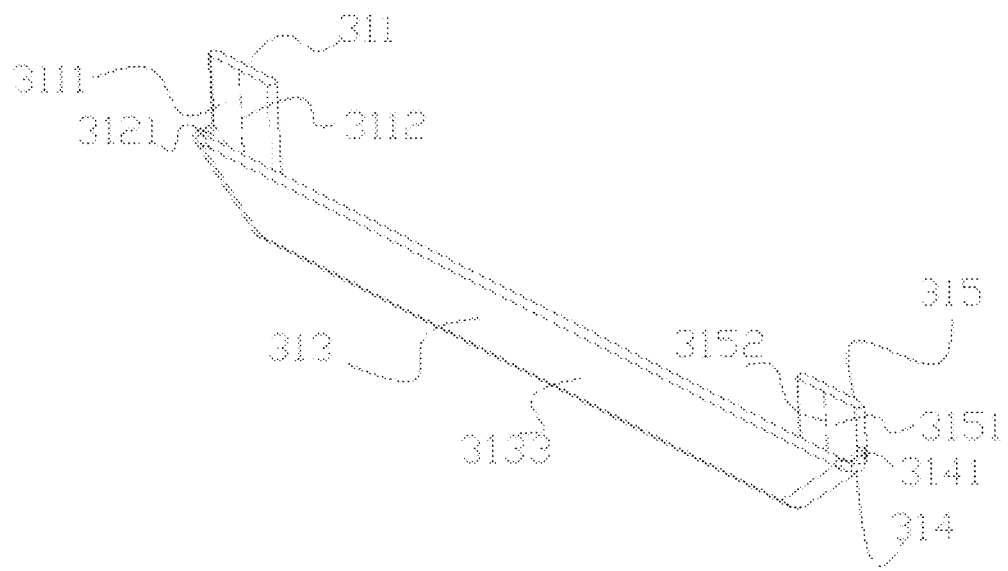
FIG. 5 is a schematic structural view of a first flat tube according to a technical solution of the present application.

The second flat tube 32 includes an end port of the third end portion, an end port of the fourth end portion and at least one communication passageway, and the end port of the third end portion is in communication with the end port of the fourth end portion through the at least one communication passageway of the second flat tube 32. The second flat tube 32 includes a second bonding portion 323. The second bonding portion 323 is substantially a longitudinally long flat structure, the second bonding portion 323 includes a second bonding surface and a fourth surface 3231, the second bonding surface is in direct or indirect connection with the first bonding surface 3133, and the fourth surface 3231 and the second bonding surface are arranged on two opposite sides of the second flat tube 32. Referring to FIG. 4, as a specific embodiment, the second flat tube 32 includes a third connecting portion 322, an end port of the third end portion of the second flat tube 32 is provided at the third connecting portion 322, and along the center line direction of the fourth surface 3231, the third connecting portion 322 is located on a side of the second bonding portion 323, wherein a longitudinal axis of the third connecting portion 322 is substantially collinear with the longitudinal axis of the second bonding portion 323, the second flat tube 32 has a simple structure and is easy to process. In another specific embodiment, the second flat tube 32 may include a third bent portion and a third connecting portion, the structure of the third bent portion is substantially the same as that of the first bent portion 312, and the structure of the third connecting portion is substantially the same as that of the first connecting portion 311, which will be briefly described below. The end port of the third end portion of the second flat tube 32 is arranged at the third connecting portion, the second bonding portion 323 and the third connecting portion are located on two sides of the third bent portion, the third bent portion includes a third bent surface, the third connecting portion includes a fifth surface, and the third bent surface extends from a side of the fourth surface 3231 to the fifth surface, or in other words, the third bent portion extends from a side of the second bonding portion to the third connecting portion. A part of the fourth surface 3231 is opposite to a part of the fifth surface. The third bent surface is bent relative to the fourth surface 3231 and/or the third bent surface is bent relative to the fifth surface. Or in other words, the third bent portion is bent relative to the second bonding portion and/or the third bent portion is bent relative to the third connecting portion. Or in other words, a part of the second bonding portion is opposite to a part of the third connecting portion, the center line of the third bent surface tilts relative to the center line of the fifth surface or tilts relative to the center line of the fourth surface, and a bending direction of the third bent portion is opposite to that of the first bent portion 311. In this way, the third connecting portion and the first connecting portion are located on two sides of the heat exchange assembly, or in other words, the first collecting pipe 11 and the third collecting pipe 13 are located on two sides of the heat exchange assembly, which facilitates the installation of the collecting pipe and the heat exchange assembly.

Figure 6:
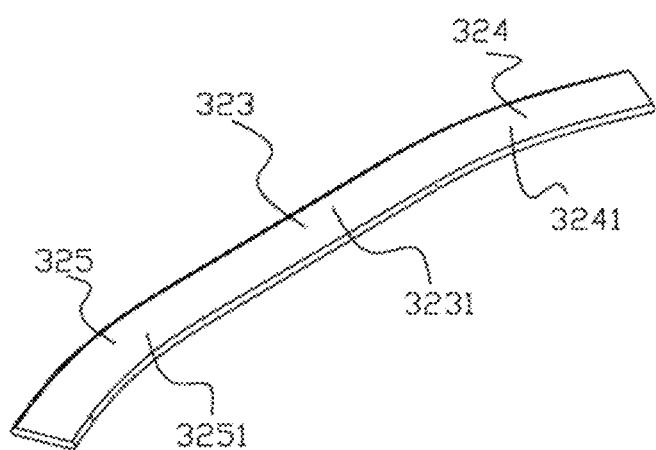
FIG. 6 is a schematic structural view of a second flat tube according to a technical solution of the present application.
Figure 7:
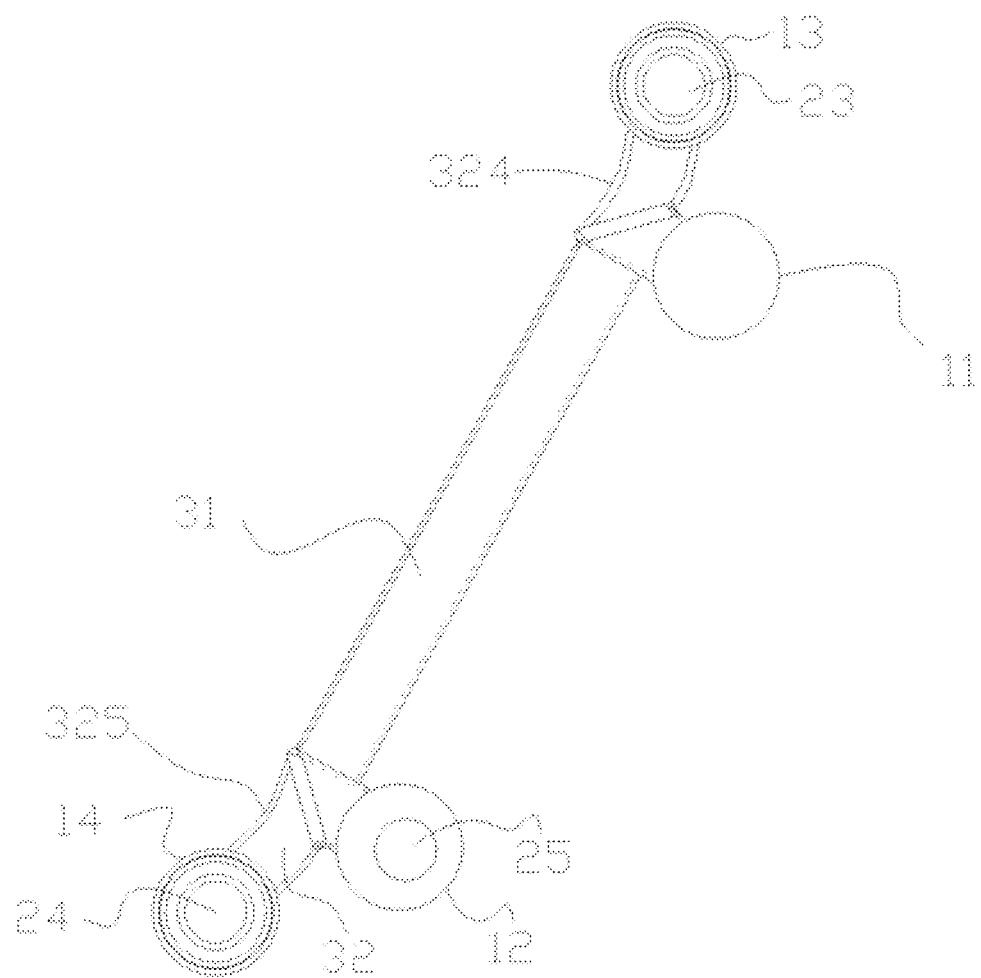
FIG. 7 is a schematic structural view of the intermediate heat exchanger according to another technical solution of the present application.
Figure 8:
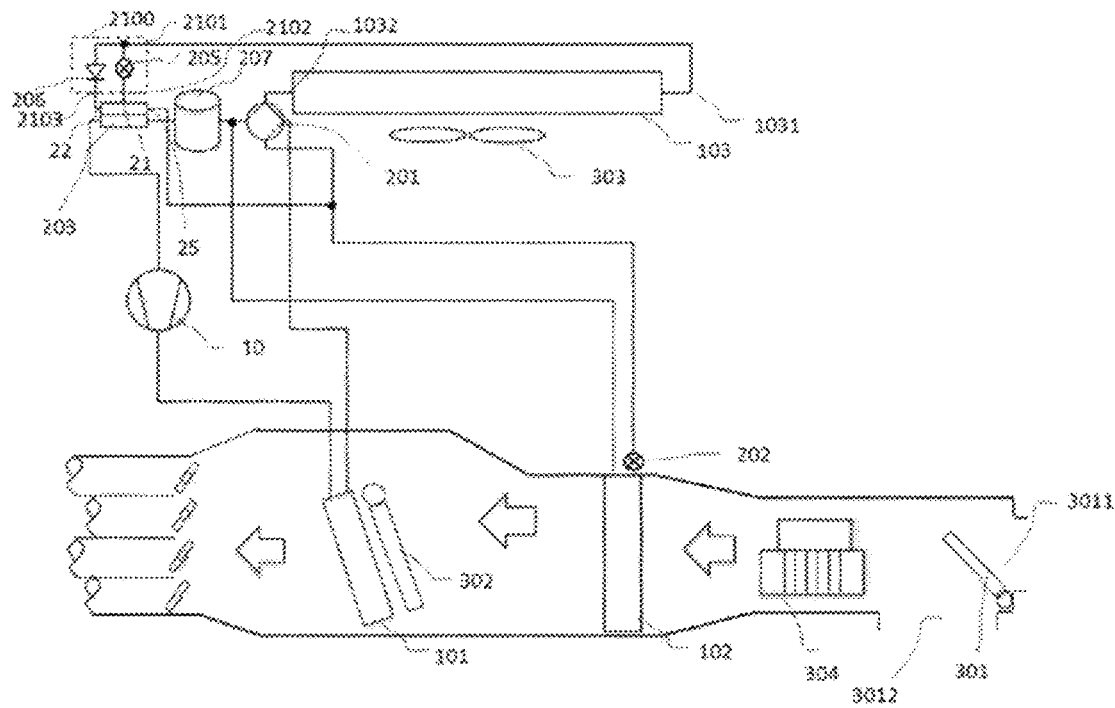
FIG. 8 is a schematic view of a thermal management system according to a first embodiment of the present application.

In another specific embodiment, referring to FIG. 6, the second flat tube 32 includes a second curved portion 324, the end port of the third end portion of the second flat tube 32 is arranged at the second curved portion 324, the second curved portion 324 includes a second curved surface 3241, the second curved surface 3241 and the fourth surface 3231 are located on a same side of the second flat tube 32, and the second curved surface 3241 extends from a side of the fourth surface 3231 toward the end port of the third end portion, or in other words, the second curved portion 324 extends from a side of the second bonding portion 323 to the third end portion, the center line of the second curved surface 3241 is bent relative to the center line of the fourth surface 3231, and the second curved surface 3241 and the fourth surface 3231 are substantially in a same plane. Similarly, in order to ensure that the third end portion of the second flat tube 32 is fixed to the first insertion slot of the third collecting pipe 13 by brazing, in the normal direction of the first surface, a projection of the third end portion of the second flat tube 32 on the first surface is not intersected with a projection of the second bonding portion 323 on the first surface. It is conceivable that an axis of the third collecting pipe 13 is perpendicular to the first surface, and in the normal direction of the first surface, the projection of the third collecting pipe 13 on the first surface is not intersected with the projection of the second bonding portion on the first surface. In this way, the third end portion of the second flat tube 32 protrudes out of the heat exchange assembly, and the third end portion of the second flat tube 32 extends into the first insertion slot of the third collecting pipe 13 and is fixed to the first insertion slot of the third collecting pipe 13 by brazing. The second flat tube includes the second curved portion 324, and the second flat tube has a simple structure and is easy to process.

Referring to FIG. 4, in a specific embodiment, the second flat tube 32 further includes a fourth connecting portion 321, the fourth end portion of the second flat tube 32 is provided at the fourth connecting portion 321, and the fourth connecting portion 321 is located at the other end of the second bonding portion 323, wherein a longitudinal axis of the fourth connecting portion 321 is substantially collinear with the longitudinal axis of the second bonding portion 323, and the second flat tube 32 has a simple structure and is easy to process. The second flat tube 32 may include a fourth bent portion and a fourth connecting portion, an end port of the fourth end portion is provided at the fourth connecting portion, the second bonding portion 323 and the fourth connecting portion are located at two opposite sides of the fourth bent portion, respectively. The fourth bent portion includes a fourth bent surface, the fourth connecting portion includes a sixth surface, the fourth bent surface extends from the other side of the fourth surface to the sixth surface, a part of the fourth surface is opposite to a part of the sixth surface, and the fourth bent surface is bent relative to the fourth surface and/or the fourth bent surface is bent relative to the sixth surface; or in other words, the center line of the fourth bent surface tilts relative to the center line of the fourth surface; or in other words, the fourth bent portion extends from the other side of the second bonding portion to the fourth connecting portion, a part of the second bonding portion 323 is opposite to a part of the fourth connecting portion, and the fourth bent portion is bent relative to the second bonding portion and/or the fourth bent portion is bent relative to the fourth connecting portion.

In another embodiment, the second flat tube 32 includes a third curved portion 325, the fourth end portion of the second flat tube 32 is provided at the third curved portion 325, the third curved portion includes a third curved surface 3251, and the third curved surface 3251 extends from a side of the fourth surface, or in other words, the third curved portion 325 starts from the other side of the second bonding portion 323, the center line of the third curved surface 3251 is bent relative to the center line of the fourth surface, and the third curved surface 3251 and the fourth surface 3231 are substantially in a same plane. Similarly, in order to ensure that the fourth end portion of the second flat tube 32 is fixed to the first insertion slot of the second collecting pipe 12 by brazing, along the normal direction of the first surface, a projection of the fourth end portion of the second flat tube 32 on the first surface 3131 is not intersected with the projection of the first bonding portion on the first surface 3131. It is conceivable that the axis of the second collecting pipe is perpendicular to the first surface 3131, and in the normal direction of the first surface 3131, the projection of the second collecting pipe 12 on the first surface 3131 is not intersected with the projection of the first bonding portion on the first surface 3131. In this way, the fourth end portion of the second flat tube 32 protrudes out of the heat exchange assembly, and the fourth end portion of the second flat tube 32 is inserted into the first insertion slot of the fourth collecting pipe 14 and is fixed to the first insertion slot of the fourth collecting pipe 14 by brazing. The first bonding portion 311 is in direct or indirect connection with a part of the second flat tube 32, the first flat tube 31 is provided with the first bent portion, the first bent portion is bent relative to the first bonding portion, the first connecting portion relatively protrudes out of the heat exchange assembly and is in communication with the first chamber, the projection of the first collecting pipe 11 is not intersected with the projection of the first bonding portion, and the first flat tube 31 of the heat exchange device includes the bent portion, the structure of which is relatively simple.

Referring to FIG. 8 to FIG. 18 and FIG. 1, the thermal management system includes a flow regulating portion 2100 which includes a first connecting port 2101, a second connecting port 2102 and a third connecting port 2103. The first connecting port 2101 is in communication with a first end port 1031 of the third heat exchanger 103, the second connecting port 2102 is in communication with the second end port 21 of the second heat exchange portion 30, and the third connecting port 2103 is in communication with the third end port 22 of the second heat exchange portion 30. Specifically, the flow regulating portion 2100 includes a throttling unit 205 and a valve unit 206. The first connecting port 2101 can communicate with the second connecting port 2102 through the throttling unit 205, and the first connecting port 2101 can communicate with the third connecting port 2103 through the valve unit 206. In other words, the throttling unit 205 is provided between the second end port 21 of the second heat exchange portion 30 and the first end port 1031 of the third heat exchanger 103 to throttle the refrigerant entering the third heat exchanger 103. The valve unit 206 and the throttling unit 205 are provided separately. The valve unit 206 may include two end ports. Specifically, the first end port of the valve unit 206 is in communication with the third connecting port 2103, or in other words, the first end port of the valve unit 206 is the third connecting port 2103; and the first end port of the throttling unit 205 is in communication with the second connecting port 2102, or in other words, the first end port of the throttling unit 205 is the second connecting port 2102. Both the second end port of the throttling unit 205 and the second end port of the valve unit 206 are in communication with the first connecting port 2101, wherein the valve unit 206 may be a shut-off valve or a two-way flow regulating valve.

In other embodiments, the valve unit 206 includes three end ports, the first end port of the valve unit 206 is in communication with the first connecting port 2101, the second end port of the valve unit 206 is in communication with the third connecting port 2103, the third end port of the valve unit 206 is in communication with the second end port of the throttling unit 205, and the first end port of the throttling unit is in communication with the second connecting port 2001, wherein the valve unit 206 may be a three-way valve or a three-way flow regulating valve. The valve unit 206 and the throttling unit 205 may be integrally arranged. The flow regulating portion 2100 includes a valve body, wherein the first connecting port 2101, the second connecting port 2102 and the third connecting port 2103 are arranged on the valve body, and the flow regulating portion 2100 further includes a valve core and a valve port which are correspondingly arranged and will not be described in detail.

In other embodiments, the valve unit 206 may be a one-way valve, wherein an inlet of the one-way valve is in communication with the first connecting port 2101, and an outlet of the one-way valve is in communication with the third connecting port 2103. In addition, the connection or communication described in this specification may be direct connection or communication, for example, two parts may be assembled together, so that the connecting pipeline can be dispensed with and the system is more compact, or the connection or communication described in this specification may be indirect connection or communication, for example, two parts may be in communication with each other through a pipeline, or two parts may be in communication with each other through a certain element. No further examples will be described herein. In the technical solution of the present application, opening the throttling unit refers to that the opening degree of the throttling unit reaches the maximum magnitude, closing the throttling unit refers to that the opening degree of the throttling unit is zero, and switching on the throttling unit refers to that the throttling unit is in a state between opening and closing, or in other words, in a throttling state of the throttling unit.

The thermal management system further includes a first valve device, wherein the refrigerant inlet of the first heat exchanger 101 is in communication with the outlet of the compressor 10, the refrigerant outlet of the first heat exchanger 101 is in communication with the first valve device, the refrigerant outlet of the first heat exchanger 101 can communicate with the second end port 1032 of the third heat exchanger 103 through the first valve device, and the first heat exchanger 101 can also communicate with the first throttling device 202 through the first valve device and/or communicate with the first end port 25 of the second heat exchange portion 30 through the first valve device, and the refrigerant outlet of the second heat exchanger 102 can also communicate with the second end port 24 of the first heat exchange portion 20 or communicate with the second end port 24 of the first heat exchange portion 20 through a gas-liquid separator 207. Specifically, the first valve device includes a first communicating port, a second communicating port, a third communicating port and a fourth communicating port. The first communicating port is in communication with the refrigerant outlet of the first heat exchanger 101, the fourth communicating port can communicate with the second end port 24 of the first heat exchange portion 20 or communicate with the second end port of the first heat exchange portion 20 through the gas-liquid separator 207, the second communicating port can communicate with the refrigerant inlet of the second heat exchanger 102 through the first throttling device 202 and/or can communicate with the first end port 25 of the second heat exchange portion 30, and the third communicating port is in communication with the second end port 1032 of the third heat exchanger 103. The first valve device at least includes a first working state and a second working state. In the first working state of the first valve device, the first communicating port of the first valve device is in communication with the third communicating port, and a communication passageway between the fourth communicating port and the second communicating port is relatively blocked. In the second working state of the first valve device, the first valve device causes a communication passageway between the first communicating port and the second communicating port to be unblocked, and causes a communication passageway between the third communicating port and the fourth communicating port to be unblocked.

Figure 16:
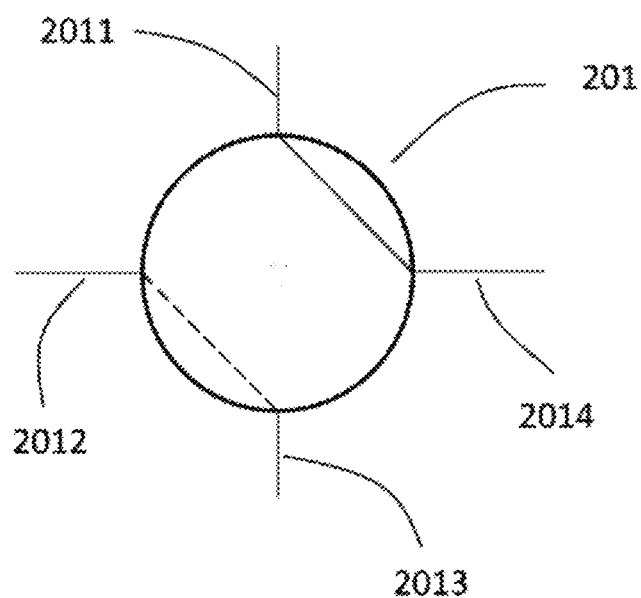
FIG. 16 is a schematic view of a first fluid switching device of the thermal management system shown in FIG. 8.
Figure 17:
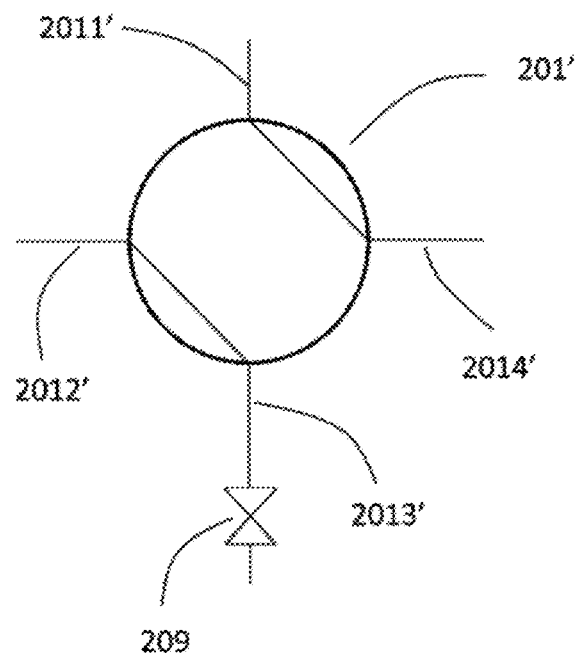
FIG. 17 is a schematic view showing that a second fluid switching device of the thermal management system is connected with a first valve member.

In a specific embodiment, the first valve device of the thermal management system may be a first fluid switching device 201. As shown in FIG. 16, the first fluid switching device 201 includes a first valve hole 2011, a second valve hole 2012, a third valve hole 2013 and a first inlet 2014, or the first fluid switching device 201 further includes a first communicating pipe in communication with the first valve hole 2011, a second communicating pipe in communication with the second valve hole 2012, a third communicating pipe in communication with the third valve hole 2013 and a fourth communicating pipe in communication with the first inlet 2014. For more detail, reference may be made to FIG. 16, wherein the first inlet 2014 is in communication with the first communicating port, the first valve hole 2011 is in communication with the third communicating port, the second valve hole 2012 is in communication with the fourth communicating port, and the third valve hole 2013 is in communication with the second communicating port, and in the first working state of the first valve device, the first fluid switching device 201 can allow the communication passageway between the first inlet 2014 and the first valve hole 2011 to be unblocked, and can close the communication passageway between the third valve hole 2013 and the second valve hole 2012; and in the second working state of the first valve device, the first fluid switching device 201 can allow the communication passageway between the first valve hole 2011 and the second valve hole 2012 to be unblocked, and can allow the communication passageway between the third valve hole 2013 and the first inlet 2014 to be unblocked.

In another specific embodiment, the first valve device may include a second fluid switching device 201' and a first valve member 209. For more detail, reference may be made to FIG. 17, wherein the second fluid switching device 201' includes a second inlet 2014', a fourth valve hole 2011', a fifth valve hole 2012' and a sixth valve hole 2013' Similarly, the second fluid switching device 201' may include a fifth communicating pipe in communication with the fourth valve hole, a sixth communicating pipe in communication with the fifth valve hole, a seventh communicating pipe in communication with the sixth valve hole and an eighth communicating pipe in communication with the second inlet 2014. The two end ports of the first valve member 209 are respectively in communication with the sixth valve hole 2013' and the second communicating port, the second inlet 2014' is in communication with the first communicating port, the fourth valve hole 2011' is in communication with the third communicating port, and the fifth valve hole 2012' is in communication with the fourth communicating port. In the first working state of the first valve device, the second fluid switching device 201' causes a communication passageway between the second inlet 2014' and the fourth valve hole 2011' to be unblocked, and can allow a communication passageway between the sixth valve hole 2013' and the fifth valve hole 2012' to be unblocked, and closes the first valve member 209. In the second working state of the first valve device, the second fluid switching device 201' can allow a communication passageway between the fourth valve hole 2011' and the fifth valve hole 2012' to be unblocked, can allow a communication passageway between the sixth valve hole 2013' and the second inlet 2014' to be unblocked, and allow the first valve member 209 to be unblocked. The first valve member 209 may be a shut-off valve, a flow regulating valve or a one-way valve. In a case that the first valve member 209 is a one-way valve, the one-way valve is blocked in the direction of the refrigerant flowing into the sixth valve hole 2013', and the one-way valve is unblocked in the direction of the refrigerant flowing out of the sixth valve hole 2013'.

Referring to FIG. 12 to FIG. 15, the thermal management system may include a first valve module 4011, a second valve module 4012 and a third valve module 4013. The first valve module 4011, the second valve module 4012 and the third valve module 4013 may be shut-off valves or two-way flow regulating valves. Both of a first end port of the first valve module 4011 and a first end port of the second valve module 4012 are in communication with the outlet of the compressor 10. A second end port of the first valve module 4011 is in communication with the refrigerant inlet of the first heat exchanger 101, a second end port of the second valve module 4012 is in communication with the second end port of the third heat exchanger 103, a second end port of the third valve module 4013 is in communication with the second end port of the first heat exchange portion 20 or is in communication with the second end port of the first heat exchange portion 20 through the gas-liquid separator 207, a first end port of the third valve module 4013 is in communication with the second end port of the third heat exchanger 103, and the refrigerant outlet of the second heat exchanger 102 is in communication with the second end port of the first heat exchange portion 20 or is in communication with the second end port of the first heat exchange portion 20 through the gas-liquid separator 207.

In other technical solutions of the present embodiment, the first valve module 4011 and the second valve module 4012 may be replaced by a first three-way valve (not shown). Specifically, a first connecting port of the first three-way valve is in communication with the outlet of the compressor 10, a second connecting port of the first three-way valve is in communication with the refrigerant inlet of the first heat exchanger 101, and a third connecting port of the first three-way valve is in communication with the second end port of the third heat exchanger 103. Or, the second valve module and the third valve module may also be replaced by a second three-way valve. Specifically, a second connecting port of the second three-way valve and the first end port of the first valve module are in communication with the outlet of the compressor 10, a first connecting port of the second three-way valve is in communication with the second end port of the third heat exchanger 103, and a third connecting port of the second three-way valve is in communication with the second end port of the second heat exchange portion 30 or is in communication with the second end port of the second heat exchange portion 30 through the gas-liquid separator. The throttling unit 205 and the first throttling device 202 may be a thermal expansion valve, an electronic expansion valve, a capillary tube or the like device that can throttle the refrigerant. The valve unit 206 may be a shut-off valve or a flow regulating valve with an on-off control function, as long as the valve unit can control the unblocking and blocking of a flow path of the refrigerant, and the valve unit may be a one-way valve that is unblocked in one direction and blocked in the other direction. The valve unit or the valve module may be integrated with the heat exchanger to form an assembly having a more compact structure, for example, an assembly formed by integrating the first throttling device 202 with the second heat exchanger 102.

The thermal management system further includes an air-conditioning box (not denoted) which includes an air-conditioning box body. The air-conditioning box body is provided with multiple air ducts (not shown) in communication with the vehicle interior, and the air ducts are provided with grilles (not shown) that can adjust the size of the air ducts. An inner circulation ventilation port 3012, an outer circulation ventilation port 3011, a circulation air door 301 for adjusting the size of the inner circulation ventilation port 3012 and the outer circulation ventilation port 3011, and a motor for driving the circulation air door 301 are provided on an air inlet side of the air conditioning box body. The inner circulation ventilation port 3012 is in communication with the inside of the vehicle, and the air inside the vehicle enters the air conditioning box body through the inner circulation ventilation port 3012, and then enters the inside of the vehicle again through the air ducts, forming inner circulation. The outer circulation ventilation port 3011 is in communication with the outside of the vehicle, and the air outside the vehicle enters the air conditioning box body through the outer circulation ventilation port 3011, and enters the inside of the vehicle through the air ducts. The circulation air door 301 is arranged between the inner circulation ventilation port 3012 and the outer circulation ventilation port 3011, and a controller can control the circulation air door 301 through the motor. When the circulation air door 301 is switched to the inner circulation ventilation port 3012, the inner circulation ventilation port 3012 can be closed, forming outer circulation. When the circulation air door 301 is switched to the outer circulation ventilation port 3011, the outer circulation ventilation port 3011 can be closed, forming the circulation inside the vehicle. The size of the inner circulation ventilation port 3012 and the outer circulation ventilation port 3011 can be adjusted by adjusting the position of the circulation air door 301, thus adjusting the ratio of the air outside the vehicle to the air inside the vehicle in the air entering the air conditioning box body. In addition, a fan 303 is provided on a side of the third heat exchanger 103, which can accelerate the wind flowing through the third heat exchanger 103. The first heat exchanger 101 is arranged in the air conditioning box body, and a blower 304 is provided at the air conditioning box body close to the inner circulation ventilation port 3012 and the outer circulation ventilation port 3011. A temperature air door 302 is also provided on a windward side of the first heat exchanger 101. The first heat exchanger 101 and the second heat exchanger 102 may be spaced by a certain distance in the air conditioning box body, or in other words, the temperature air door 302 is arranged between the first heat exchanger 101 and the second heat exchanger 102. When the temperature air door 302 is open, the air blown in from the inner circulation ventilation port 3012 or the outer circulation ventilation port 3011 can pass through the first heat exchanger 101 behind the temperature air door 302, and when the temperature air door 302 is closed, the air blown in from the inner circulation ventilation port 3012 or the outer circulation ventilation port 3011 cannot flow through the first heat exchanger 101, but flows through the passageways on two sides of the temperature air door 302, and then enters the inside of the vehicle through the air ducts.

Figure 9:
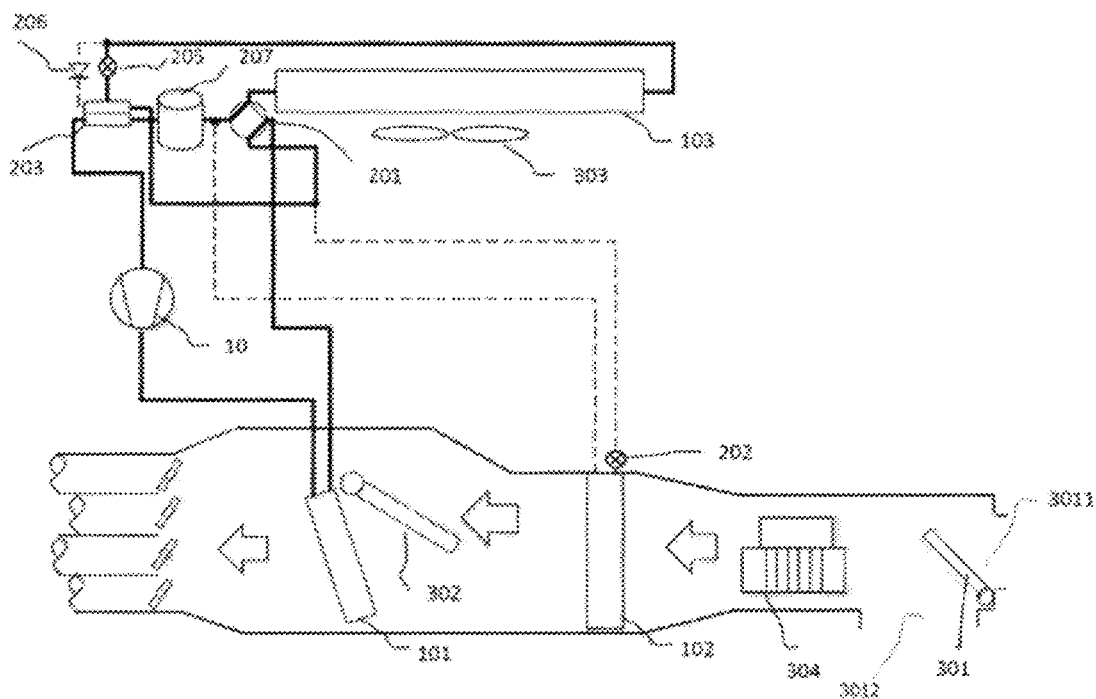
FIG. 9 is a schematic view of the thermal management system in FIG. 8 in a heating mode.
Figure 13:
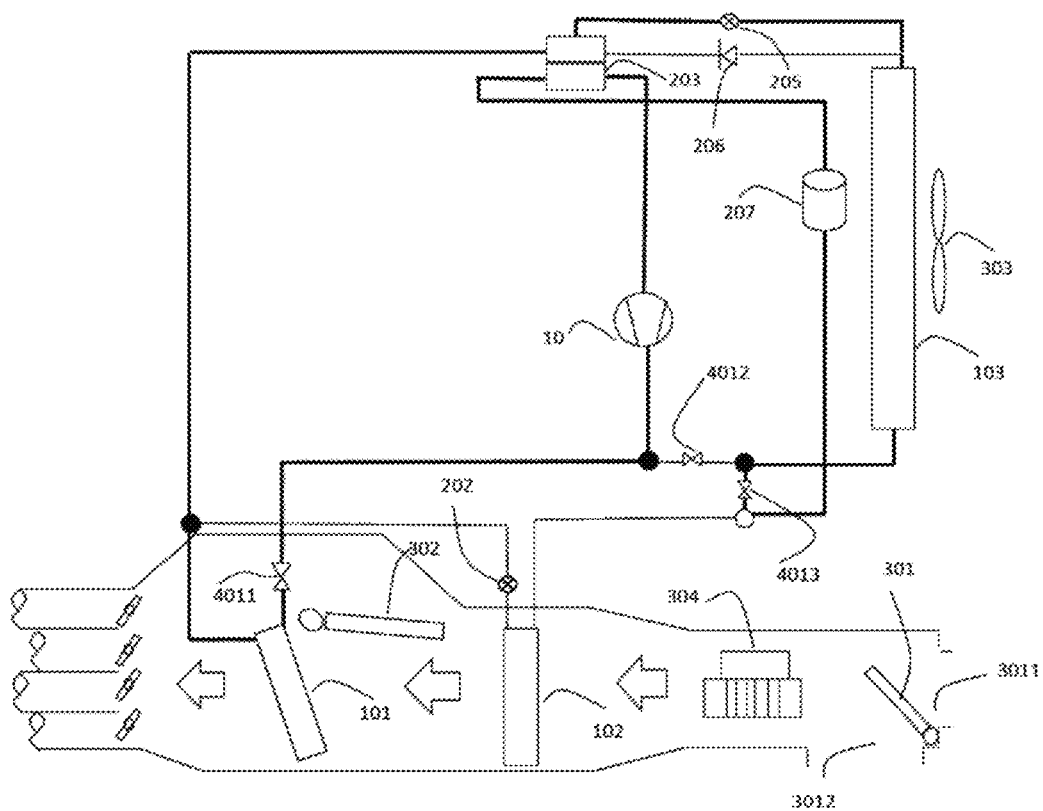
FIG. 13 is a schematic view of the thermal management system in FIG. 12 in the heating mode.

The thermal management system has a heating mode, a refrigerating mode and a dry mode. The working conditions of the thermal management system under different modes are respectively illustrated hereinafter. When the ambient temperature is low and the passenger compartment needs heat to improve the comfort of passengers, the thermal management system enters the heating mode, as shown in FIG. 1, FIG. 9 and FIG. 13. Specifically, FIG. 9 is taken as an example for introducing. In the heating mode, the first fluid switching device 201 is in the second working state, the throttling unit 205 is open, the refrigerant of the thermal management system is compressed by the compressor 10, changing from a low temperature and low pressure refrigerant into a high temperature and high pressure refrigerant; the refrigerant from an outlet end of the compressor 10 enters the first heat exchanger 101 through the refrigerant inlet of the first heat exchanger 101, and at this time, the temperature air door 302 is opened, the refrigerant of the first heat exchanger 101 exchanges heat with the air around the first heat exchanger 101 in the air ducts, the refrigerant of the first heat exchanger 101 releases heat to the surrounding air and becomes into a low temperature and high pressure liquid refrigerant. A flow path leading to the first end port 25 of the second heat exchange portion 30 from the refrigerant outlet of the first heat exchanger 101 is unblocked, and a flow path leading to the second heat exchanger 102 is blocked. Specifically, the refrigerant enters the first sub-chamber 1201 through the first end port 25 of the second heat exchange portion 30, and the refrigerant in the first sub-chamber 1201 enters the first chamber through the first sub-portion and then flows out of the second heat exchange portion 30 through the second end port 21 of the second heat exchange portion 30. Only the first flat tube of the first sub-portion and the second flat tube at the corresponding position participate in the heat exchange. More specifically, the refrigerant entering the first flat tube 31 exchanges heat with the refrigerant entering the corresponding second flat tube 32 at a bonding portion between the first flat tube and the corresponding second flat tube. The "corresponding second flat tube" herein refers to the second flat tube 32 which is bonded with the first flat tube 31 in the first sub-portion 3101. When the thermal management system is heating, only a part of the refrigerant flowing through the second flat tube 32 exchanges heat with the refrigerant flowing through the first sub-portion 3101. The refrigerant discharged from the second end port 21 of the second heat exchange portion 30 enters the third heat exchanger 103 after being throttled and depressurized by the throttling unit 205. The low temperature and low pressure liquid refrigerant exchanges heat around the third heat exchanger 103 with the air around the heat exchanger, absorbing the heat of the air. The throttling unit 205 opens a path between the second end port 21 of the second heat exchange portion 30 and the first end port of the third heat exchanger 103, or the throttling unit 205 and the valve unit 206 open a path between the second end port 21 of the second heat exchange portion 30 and the first end port of the third heat exchanger 103, the valve unit 206 causes a path between the third end port of the second heat exchange portion 30 and the first end port of the third heat exchanger 103 be blocked, and the fan 303 close to the third heat exchanger 103 blows the air around the third heat exchanger 103 to form an air flow, and accelerates the heat exchange between the third heat exchanger 103 and the surrounding air, and the refrigerant absorbs the heat in the air and becomes a gas-liquid mixed state refrigerant; the refrigerant of the third heat exchanger 103 enters the first heat exchange portion 20 through the first fluid switching device 201, and the refrigerant of the first heat exchange portion 20 exchanges heat with the refrigerant of the second heat exchange portion 30 to become a lower temperature and lower pressure gaseous refrigerant to enter the compressor. The thermal management system is provided with the intermediate heat exchanger 203. When the thermal management system is heating, the refrigerant exchanges heat sufficiently in the first heat exchanger 101, and the temperature of the refrigerant at the outlet of the first heat exchanger is relatively low, or in other words, the temperature of the refrigerant at the first end port of the second heat exchange portion 30 is relatively low, and the required heat exchange amount of the intermediate heat exchanger 203 is relatively small. Therefore, the requirements can be satisfied with the refrigerant flowing through the second heat exchange portion 30 exchanging heat with only a part of the refrigerant flowing through the first heat exchange portion 20. In addition, when the thermal management system is heating, the heat exchange amount of the intermediate heat exchanger 203 is relatively small, and the refrigerant conveying amount of the compressor can be increased by increasing the density of the refrigerant at the inlet of the compressor. When the refrigerant may be in a liquid state or a gas-liquid two-phase state, the gas-liquid separator 207 can be arranged in front of the second end port of the first heat exchange portion 20. After the separation of the gas-liquid separator 207, the liquid refrigerant is stored in the gas-liquid separator 207, and the low temperature and low pressure gaseous refrigerant enters the first heat exchange portion 20 and then enters the compressor after exchanging heat with the refrigerant in the second heat exchange portion 30, which is compressed into the high temperature and high pressure refrigerant by the compressor 10 again. The system operates in such a cycle. In addition, in the case that the compressor can bear the liquid refrigerant, the gas-liquid separator 207 may not be provided, and the gas-liquid separator 207 may be replaced by a liquid receiver. In the case that the refrigerant is not a two-phase flow, the gas-liquid separator may not be provided either.

Figure 10:
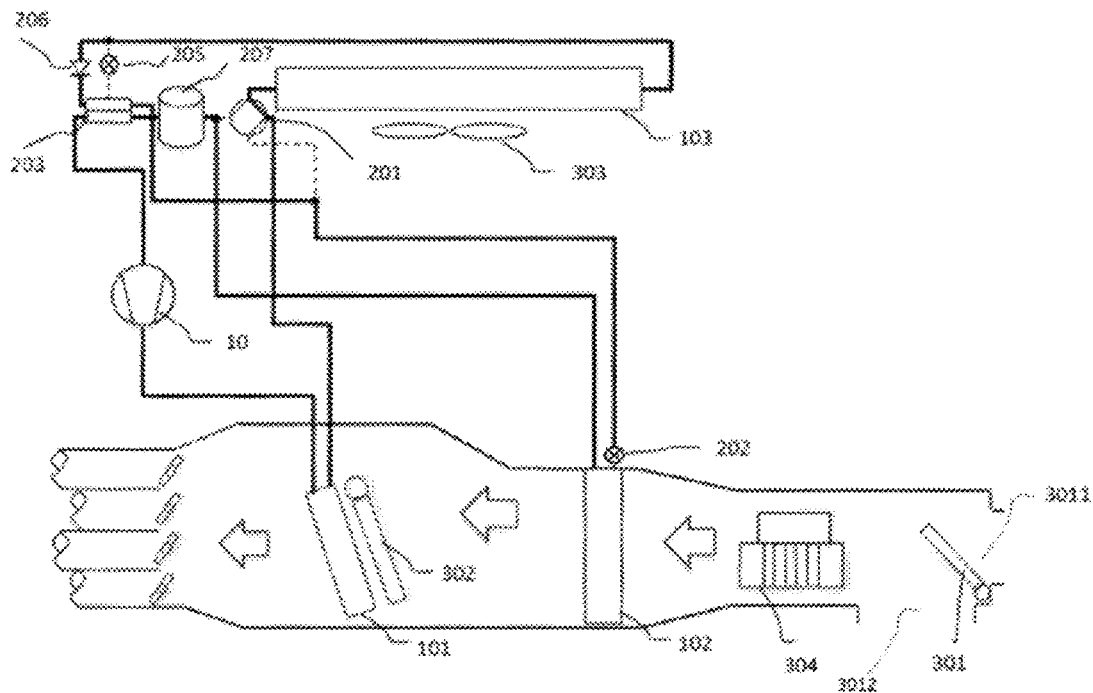
FIG. 10 is a schematic view of the thermal management system in FIG. 8 in a refrigerating mode.
Figure 14:
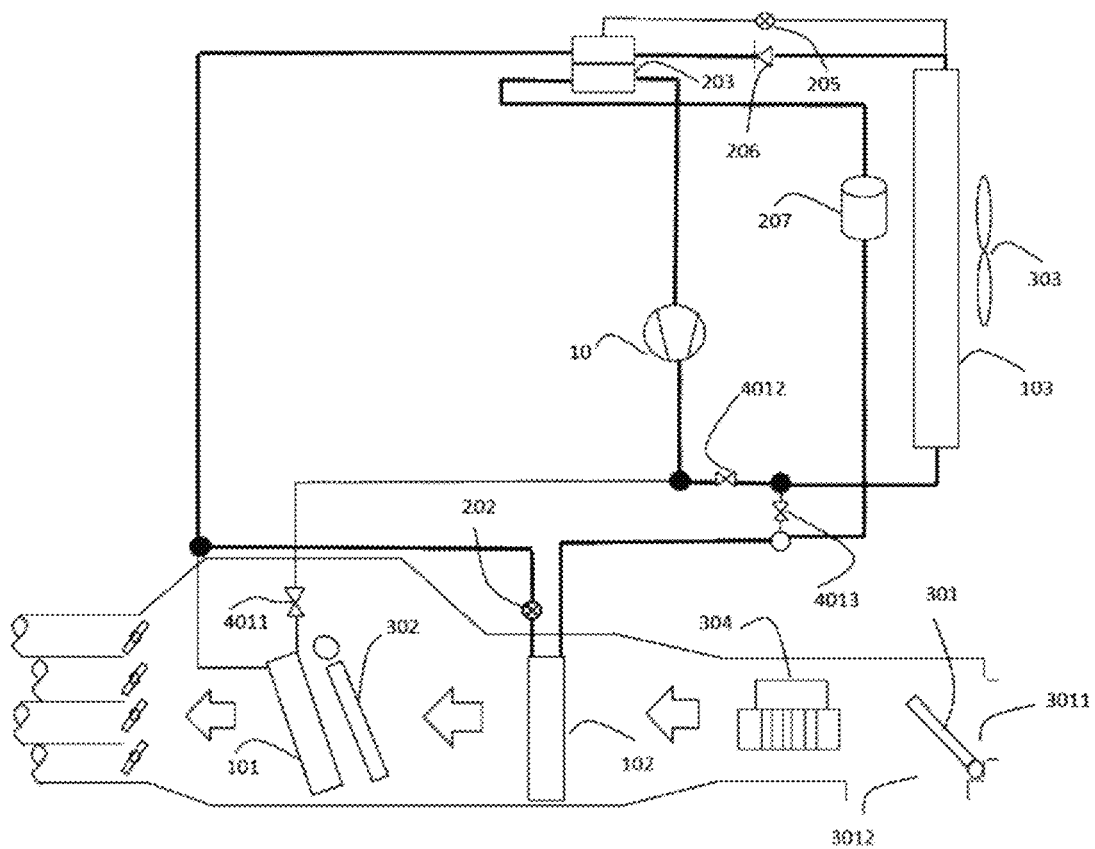
FIG. 14 is a schematic view of the thermal management system in FIG. 12 in the refrigerating mode.

When the temperature in the passenger compartment is relatively high and needs to be lowered to improve comfort, the thermal management system enters the refrigerating mode, as shown in FIG. 10 and FIG. 14. Specifically, FIG. 10 is taken as an example for introducing. The refrigerant becomes a high temperature and high pressure refrigerant after being compressed by the compressor 10, the refrigerant discharged from the compressor 10 enters the first heat exchanger 101, and at this time the temperature air door 302 of the first heat exchanger 101 is closed, and the airflow bypasses the first heat exchanger 101. The first heat exchanger 101 hardly participates in the heat exchange, and the first heat exchanger 101 is a flow passageway of the refrigerant. The first fluid switching device 201 is in the first working state, the refrigerant discharged from the first heat exchanger 101 enters the second end port of the third heat exchanger 103 through the first valve device, and the refrigerant exchanges heat around the third heat exchanger 103 with the surrounding air, releases heat to the surrounding air and becomes a relatively low temperature and high pressure refrigerant. The refrigerant cooled by the third heat exchanger 103 enters the third end port 22 of the second heat exchange portion 30 through the valve unit 206, and the relatively low temperature and high pressure refrigerant discharged from the first end port 25 of the second heat exchange portion 30 enters the second heat exchanger 102 after being throttled and depressurized by the first throttling device 202, and at this time, the refrigerant outlet of the second heat exchanger 102 is in communication with the second end port 24 of the first heat exchange portion 20, the throttle unit 205 and/or the valve unit 206 is closed, and the refrigerant of the second heat exchanger 102 absorbs the heat of the airflow, or in other words, the refrigerant in the second heat exchanger 102 cools the surrounding air, and the refrigerant in the gas-liquid mixed state discharged from the refrigerant outlet of the second heat exchanger 102 enters the first heat exchange portion 20. In the intermediate heat exchanger 203, the refrigerant entering the first flat tube 31 exchanges heat with the second flat tube 32 at the bonding portion between the first flat tube and the second flat tube, that is, the refrigerant flowing through the first sub-portion 3101 exchanges heat with the refrigerant flowing through the corresponding second flat tube 32, the refrigerant flowing through the second sub-portion 3102 exchanges heat with the refrigerant flowing through the corresponding second flat tube 32, and the refrigerant discharged from the second heat exchange portion 30 becomes a lower temperature and high pressure refrigerant. The "corresponding second flat tube" herein refers to the second flat tube 32 which is bonded with the first flat tube 31 in the first sub-portion 3101, or the second flat tube 32 which is bonded with the first flat tube in the second sub-portion 3102. When the thermal management system is refrigerating, the ambient temperature is generally high, the heat exchange of the refrigerant in the third heat exchanger 103 is relatively insufficient, the temperature of the refrigerant at the outlet of the third heat exchanger 103 is relatively high, or in other words, the temperature of the refrigerant at the third end port 22 of the second heat exchange portion 30 is relatively high, and the refrigerant needs to be further cooled at the second heat exchange portion 30. Therefore, the refrigerant flowing through the second heat exchange portion 30 exchanges heat with all the refrigerant flowing through the first heat exchange portion 20, which further improves the refrigerating amount of the refrigerant in the second heat exchanger and is conducive to improving the performance of the thermal management system.

Figure 11:
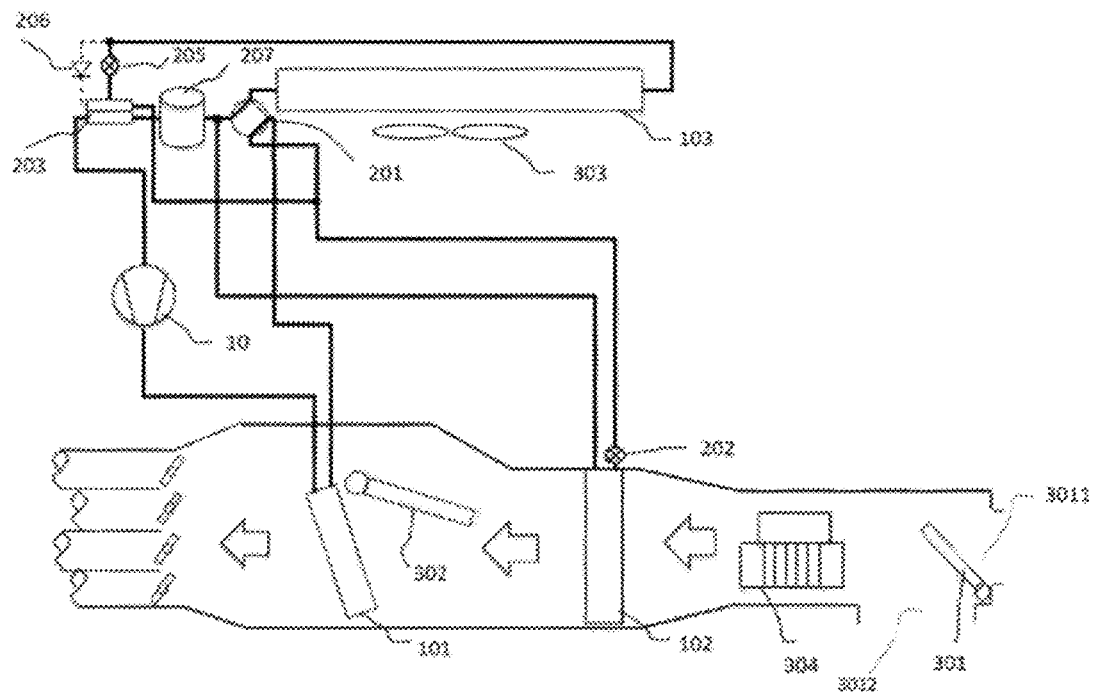
FIG. 11 is a schematic view of the thermal management system in FIG. 8 in a dry mode.
Figure 12:
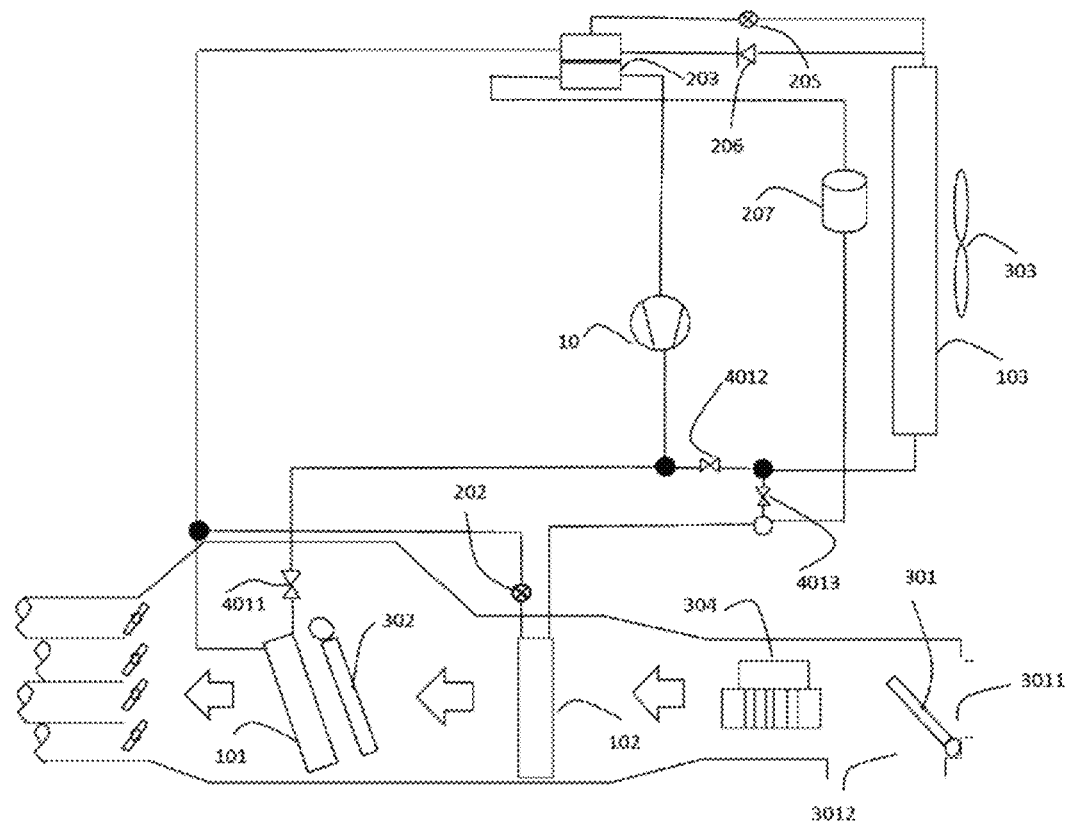
FIG. 12 is a schematic view of the thermal management system according to a second embodiment of the present application.
Figure 15:
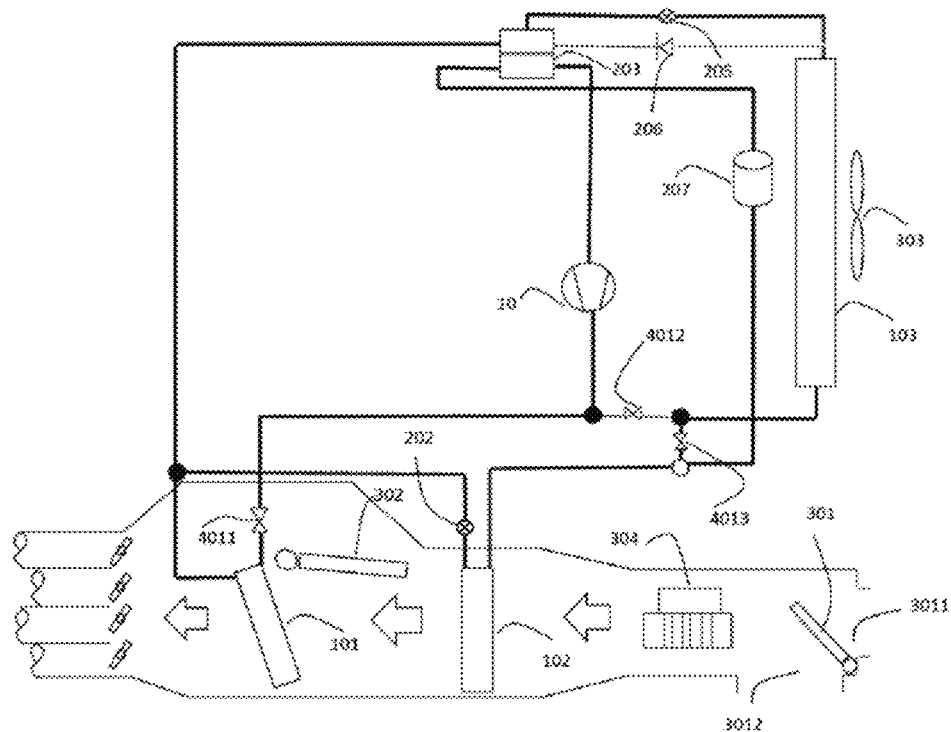
FIG. 15 is a schematic view of the thermal management system in FIG. 12 in the dry mode.

When the relative humidity of the passenger compartment of the vehicle is high, the water vapor in the air is easy to condense on the window glass, which affects the vision and forms a potential safety hazard. Therefore, the air in the passenger compartment needs to be dehumidified, which corresponds to the dry mode of the thermal management system. The dry mode includes the first dry mode and the second dry mode. When the air temperature is low and the heating demand is large, the first dry mode is used. Referring to FIG. 11 and FIG. 15, FIG. 11 is taken as an example to introduce the first dry mode hereinafter. In the first dry mode, the temperature air door 302 is opened, the first valve device is controlled to be in the second working state, the refrigerant outlet of the first heat exchanger 101 is in communication with the first throttling device 202 located in front of the second heat exchanger 102 through the first fluid switching device 201, and the refrigerant outlet of the first heat exchanger 101 is in communication with the first end port 25 of the second heat exchange portion 30; the throttling unit 205 and the first throttling device 202 are opened, and the communication passageway between the third end port 22 of the second heat exchange portion 30 and the first end port 1031 of the third heat exchanger 103 is closed by closing the valve unit 206; the refrigerant becomes the high temperature and high pressure gas after being compressed by the compressor 10, the refrigerant discharged from the compressor 10 enters the first heat exchanger 101, and at this time, the temperature air door 302 is opened, the high temperature and high pressure refrigerant exchanges heat around the first heat exchanger 101 with the air around the first heat exchanger 101, and releases heat to the air around the first heat exchanger 101; a part of the refrigerant discharged from the first heat exchanger 101 enters the first throttling device 202, and the refrigerant is throttled and depressurized by the first throttling device 202 to become a low temperature and low pressure refrigerant, and the low temperature and low pressure refrigerant exchanges heat around the second heat exchanger 102 with the surrounding air and absorbs the heat of the surrounding air. Due to the low humidity on a surface of the second heat exchanger 102, the water vapor in the air condenses, the air is cooled and dehumidified, and the refrigerant enters the first heat exchange portion 20 through the refrigerant outlet of the second heat exchanger 102. Similarly, the other a part of the refrigerant discharged from the first heat exchanger 101 enters the first sub-portion and exchanges heat with the refrigerant flowing through the corresponding second flat tube 32 of the first heat exchange portion 20. The "corresponding second flat tube" herein refers to the second flat tube 32 which is bonded with the first flat tube 31 in the first sub-portion. When the thermal management system is heating, only a part of the refrigerant flowing through the second flat tube 32 exchanges heat with the refrigerant flowing through the first sub-portion. Specifically, the refrigerant enters the first sub-chamber 1201 through the first end port 25, and the refrigerant in the first sub-chamber 1201 enters the first chamber through the first sub-portion, and then flows out of the second heat exchange portion 30 through the second end port 21. Only the first flat tube 31 of the first sub-portion and the second flat tube 32 at a corresponding position participate in the heat exchange. Then the refrigerant enters the throttling unit 205 from the second end port 21 of the second heat exchange portion 30. The refrigerant after being throttled by the throttling unit 205 is depressurized into the low temperature and low pressure medium. The low temperature and low pressure refrigerant exchanges heat around the second heat exchanger 102 with the surrounding air, absorbs the heat of the surrounding air, and becomes the low temperature and low pressure refrigerant, and then enters the first heat exchange portion 20 to exchange heat with the refrigerant of the second heat exchange portion 30. It is conceivable that, in the first dry mode, a part of the refrigerant flowing through the first heat exchange portion 20 exchanges heat with the refrigerant flowing through the second heat exchange portion 30, that is, the refrigerant flowing through the first flat tube 31 of the first sub-portion 3101 can exchange heat with the refrigerant flowing through the corresponding second flat tube 32. Similarly, the thermal management system is provided with the intermediate heat exchanger 203. When the thermal management system is in the first dry mode, the refrigerant exchanges heat sufficiently in the first heat exchanger 101, and the temperature of the refrigerant at the outlet of the first heat exchanger 101 is relatively low, or in other words, the temperature of the refrigerant at the first end port 25 of the second heat exchange portion 30 is relatively low, and the required heat exchange amount of the intermediate heat exchanger 203 is relatively small. Therefore, the requirements can be satisfied with the refrigerant flowing through the first heat exchange portion 20 exchanging heat with only a part of the refrigerant flowing through the second heat exchange portion 30. In addition, when the thermal management system is in the first dry mode, the heat exchange amount of the intermediate heat exchanger 203 is relatively small, and the refrigerant conveying amount of the compressor can be increased by increasing the density of the refrigerant at the inlet of the compressor.

When the heating demand is not large, the second dry mode can be used. The second dry mode is introduced hereinafter with the thermal management system shown in FIG. 8 as an example. In this mode, the first valve device is in the first working state, the refrigerant outlet of the first heat exchanger 101 is in communication with the second end port 1032 of the third heat exchanger 103, the valve unit 206 causes the passageway between the first end port 1031 of the third heat exchanger 103 and the third end port 22 of the second heat exchange portion 30 to be unblocked, the refrigerant entering the second heat exchange portion 30 enters the first throttling device 202 through the first end port 25 of the second heat exchange portion 30, the first throttling device 202 is opened, and the throttling unit 205 causes the second end port of the third heat exchanger 103 not to communicate with the second end port 21 of the second heat exchange portion 30. The refrigerant becomes the high temperature and high pressure gas after being compressed by the compressor 10. The refrigerant discharged by the compressor 10 enters the first heat exchanger 101. At this time, the temperature air door 302 is opened, the refrigerant exchanges heat around the first heat exchanger 101 with the surrounding air, and the surrounding air absorbs the heat of the refrigerant in the first heat exchanger 101 and heats up. The refrigerant enters the third heat exchanger 103 through the first fluid switching device 201, exchanges heat with the air around the third heat exchanger 103, releases heat to the surrounding air, and becomes the low temperature and high pressure refrigerant. The refrigerant cooled by the third heat exchanger 103 enters the first flat tube 31 through the valve unit 206, that is, the refrigerant entering the first flat tube 31 exchanges heat with the refrigerant in the corresponding second flat tube 32 at a bonding portion between the first flat tube and the corresponding second flat tube. In the intermediate heat exchanger 203, the refrigerant entering the first flat tube 31 exchanges heat with the second flat tube 32 at the bonding portion between the first flat tube and the second flat tube, that is, the refrigerant flowing through the first sub-portion 3101 exchanges heat with the refrigerant flowing through the corresponding second flat tube 32, the refrigerant flowing through the second sub-portion 3102 exchanges heat with the refrigerant flowing through the corresponding second flat tube 32, and the refrigerant discharged from the second heat exchange portion 30 becomes a lower temperature and high pressure refrigerant. The "corresponding second flat tube" herein refers to the second flat tube which is bonded with the first flat tube in the first sub-portion, or the second flat tube which is bonded with the first flat tube in the second sub-portion. And then the refrigerant enters the second heat exchanger 102 through the first throttling device 202 again. At this time, the refrigerant exchanges heat with the surrounding air around the second heat exchanger 102, and absorbs the heat of the surrounding air, and the air around the second heat exchanger 102 is cooled and dehumidified. The water vapor in the air condenses at the low temperature, thus reaching an object of dehumidification. The refrigerant enters the first heat exchange portion 20 after being discharged from the second heat exchanger 102, and exchanges heat with the refrigerant of the second heat exchange portion 30. At this time, the temperature air door 302 in front of the first heat exchanger 101 of the air conditioning box body is fully opened. The airflow is first cooled and dehumidified by the second heat exchanger 102 to become a low temperature and low humidity airflow, and then is heated into a low humidity airflow by the first heat exchanger 101. The heated air flow enters the inside of the vehicle through the grilles, realizing the function of dehumidifying the inside of the vehicle. When the thermal management system is in the second dry mode, although the refrigerant releases heat around the first heat exchanger 101, and then the refrigerant exchanges heat around the third heat exchanger 103, due to the high ambient temperature and the high temperature in the air conditioning box, the heat exchange between the refrigerant and the air flow is relatively insufficient, the temperature of the refrigerant at the first end port of the third heat exchanger 103 is relatively high, or in other words, the temperature of the refrigerant at the third end port 22 of the second heat exchange portion 30 is relatively high, and the refrigerant needs to be further cooled at the second heat exchange portion 30. Therefore, the refrigerant flowing through the second heat exchange portion 30 exchanges heat with all the refrigerant flowing through the first heat exchange portion 20, which further improves the refrigerating amount of the refrigerant in the second heat exchanger 102 and is conducive to improving the performance of the thermal management system.

The thermal management system is provided with the intermediate heat exchanger 203, and the second heat exchange portion 30 of the intermediate heat exchanger 203 includes the first end port 25, the second end port 21 and the third end port 22. When the thermal management system is heating, the refrigerant flows in the passageway between the first end port 25 and the third end port 21 of the second heat exchange portion 30, and all the refrigerant flowing through the first heat exchange portion 20 exchanges heat with the refrigerant flowing through the second heat exchange portion 30. When the thermal management system is refrigerating, the refrigerant flows in the passageway between the second end port 21 and the first end port 25 of the second heat exchange portion 30, and a part of the refrigerant flowing through the first heat exchange portion 20 exchanges heat with the refrigerant flowing through the second heat exchange portion 30. When the thermal management system is heating or refrigerating, the heat exchange amount of the intermediate heat exchanger 203 is correspondingly adjusted by the thermal management system to meet the work needs of the thermal management system, which is conducive to improving the performance of the thermal management system.

Figure 18:
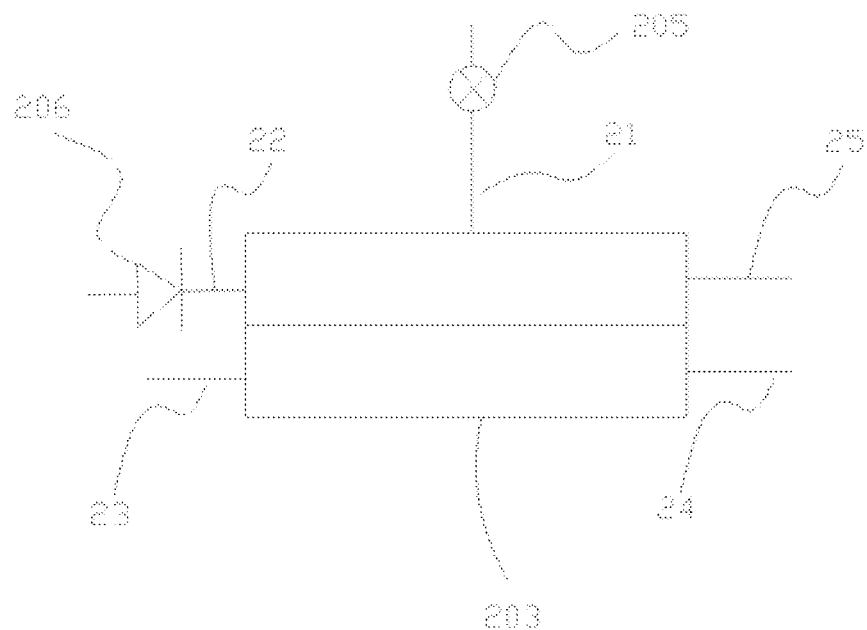
FIG. 18 is a schematic view showing one connection arrangement of the intermediate heat exchanger, a valve unit and a throttling unit.
Figure 19:
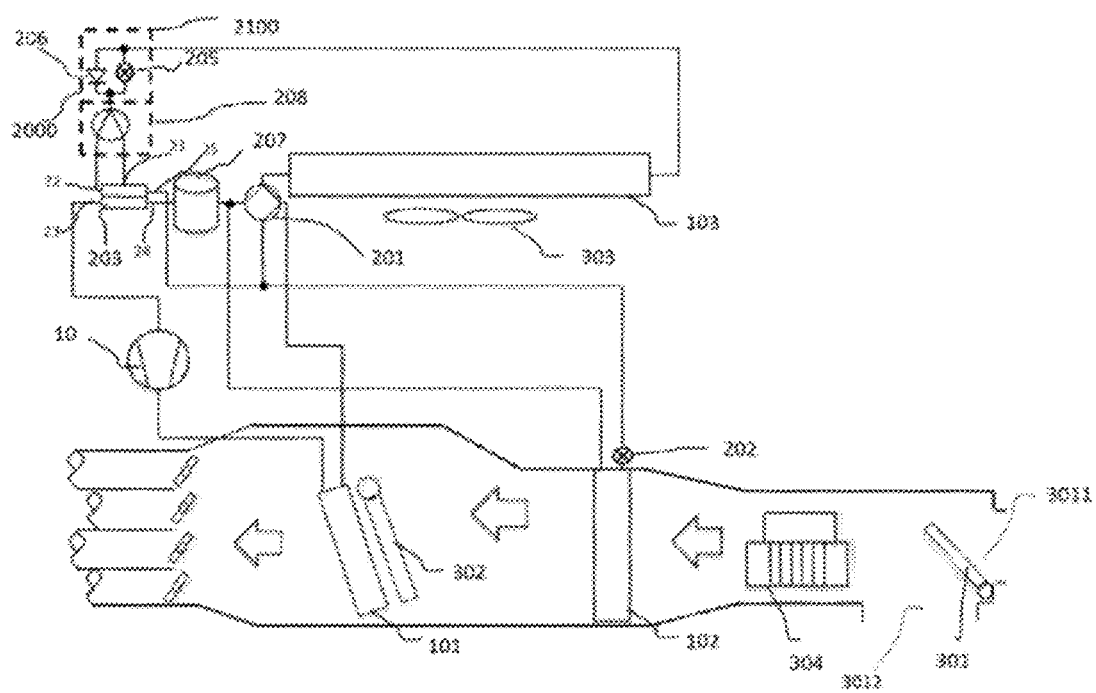
FIG. 19 is a schematic view of the thermal management system according to a third embodiment of the present application.

Referring to FIG. 19, FIG. 18 and FIG. 1, the thermal management system includes a fluid control device 2000 which includes at least one throttling unit 205 and at least one valve unit 206. Similar to the flow regulating portion 2100 described above, when the thermal management system is working, the second end port 21 of the second heat exchange portion or the third end port 22 of the second heat exchange portion 30 can communicate with the first end port 1031 of the third heat exchanger through the throttling unit 205, or the first end port 1031 of the third heat exchanger can communicate with the second end port 21 of the second heat exchange portion 30 or with the third end port 22 of the second heat exchange portion 30 through the valve unit 206.

Figure 21:
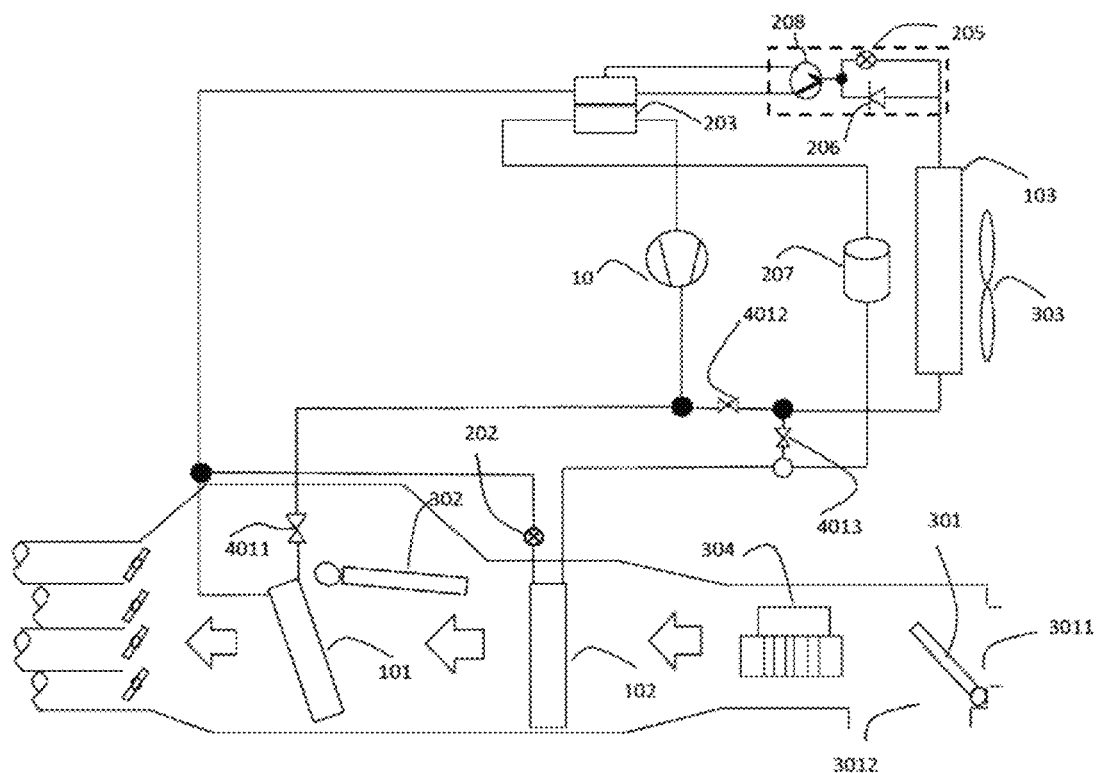
FIG. 21 is a schematic view of the thermal management system according to a fifth embodiment of the present application.
Figure 22:
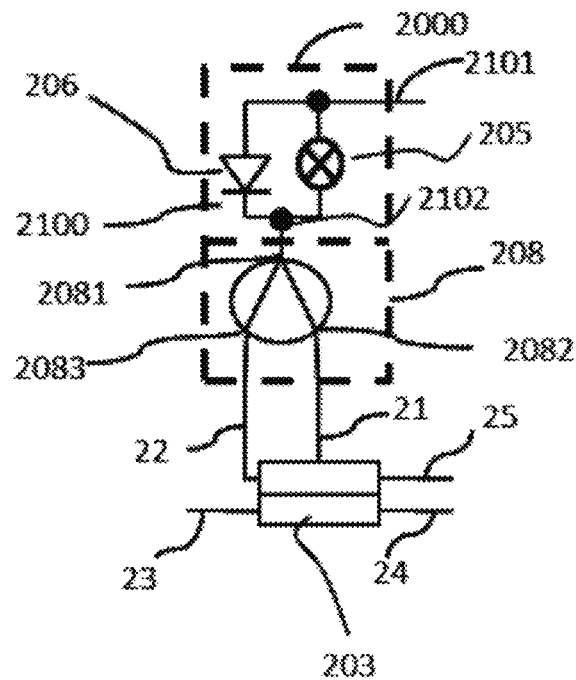
FIG. 22 is a schematic view showing a first connection arrangement of the intermediate heat exchanger, a fluid switching portion and a flow regulating portion.

Referring to FIG. 19 and FIG. 22, compared with the first embodiment, the fluid control device further includes a fluid switching portion 208. The flow regulating portion 2100 and the fluid switching portion 208 may be integrally arranged, for example, the fluid control device may be an integrated assembly. The flow regulating portion 2100 and the fluid switching portion 208 may be provided separately, and the flow regulating portion 2100 is in communication with the fluid switching portion 208 through a pipeline. The flow regulating portion 2100 is connected with the fluid switching portion 208 in series, the connection in series here refers to that when the thermal management system is working, the refrigerant passes through fluid switching portion 208 after passing through the flow regulating portion 2100, or the refrigerant passes through the flow regulating portion 2100 after passing through the fluid switching portion 208. The first end port 1031 of the third heat exchanger 103 can communicate with the first end port 2081 of the fluid switching portion through the flow regulating portion 2100, the second end port 2082 of the fluid switching portion is in communication with the second end port 21 of the second heat exchange portion 30, and the third end port 2083 of the fluid switching portion is in communication with the third end port 22 of the second heat exchange portion 30. For more detail, reference may be made to FIG. 21. The fluid switching portion 208 may be mechanically controlled or electronically controlled, for example, the air conditioning controller outputs a signal to the fluid switching portion 208, the fluid switching portion 208 can act accordingly. The operation mode of the fluid switching portion 208 includes: the first end port 2081 of the fluid switching portion is in communication with the second end port 2082 of the fluid switching portion, and the first end port 2081 of the fluid switching portion is not in communication with the third end port 2083 of the fluid switching portion; or the first end port 2081 of the fluid switching portion is in communication with the third end port 2083 of the fluid switching portion, and the first end port 2081 of the fluid switching portion is not in communication with the second end port 2082 of the fluid switching portion. Therefore, by controlling the fluid switching portion 208, in the same working mode of the thermal management system, the first end port 1031 of the third heat exchanger 103 can either communicate with the second end port 21 of the second heat exchange portion 30 or communicate with the third end port 22 of the second heat exchange portion 30 through the fluid control device 2000. For example, in the heating mode of the thermal management system, the first end port 1031 of the third heat exchanger may communicate with the second end port 21 of the second heat exchange portion 30, and the first end port 1031 of the third heat exchanger may not communicate with the third end port 22 of the second heat exchange portion 30. When the working condition is different or other conditions are different, the controller may adjust the fluid switching portion 208, so that the first end port 1031 of the third heat exchanger is in communication with the third end port 22 of the second heat exchange portion 30, and the first end port 1031 of the third heat exchanger is not in communication with the second end port 21 of the second heat exchange portion 30. The fluid switching portion 208 may be a three-way valve, a three-way flow regulating valve or a combination of two shut-off valves, which will not be described in detail.

In the present embodiment, referring to FIG. 22, the flow regulating portion 2100 includes a first connecting port 2101 and a second connecting port 2102, the first connecting port 2101 is in communication with the first end port 1031 of the third heat exchanger 103, and the second connecting port 2102 is in communication with the first end port 2081 of the fluid switching portion. Specifically, the flow regulating portion includes the valve unit 206 and the throttling unit 205. The first connecting port 2101 of the flow regulating portion can communicate with the second connecting port 2102 of the flow regulating portion through the valve unit 206, and the second connecting port 2102 of the flow regulating portion can communicate with the first connecting port 2101 of the flow regulating portion through the throttling unit 205. In other words, the throttling unit 205 is provided between the first end port 2081 of the fluid switching portion and the first end port 1031 of the third heat exchanger 103 to throttle the refrigerant entering the third heat exchanger 103. The valve unit 206 and the throttling unit 205 may be integrally arranged. For example, the valve unit 206 and the throttling unit 205 are made in the form of an integrated assembly.

Figure 23:
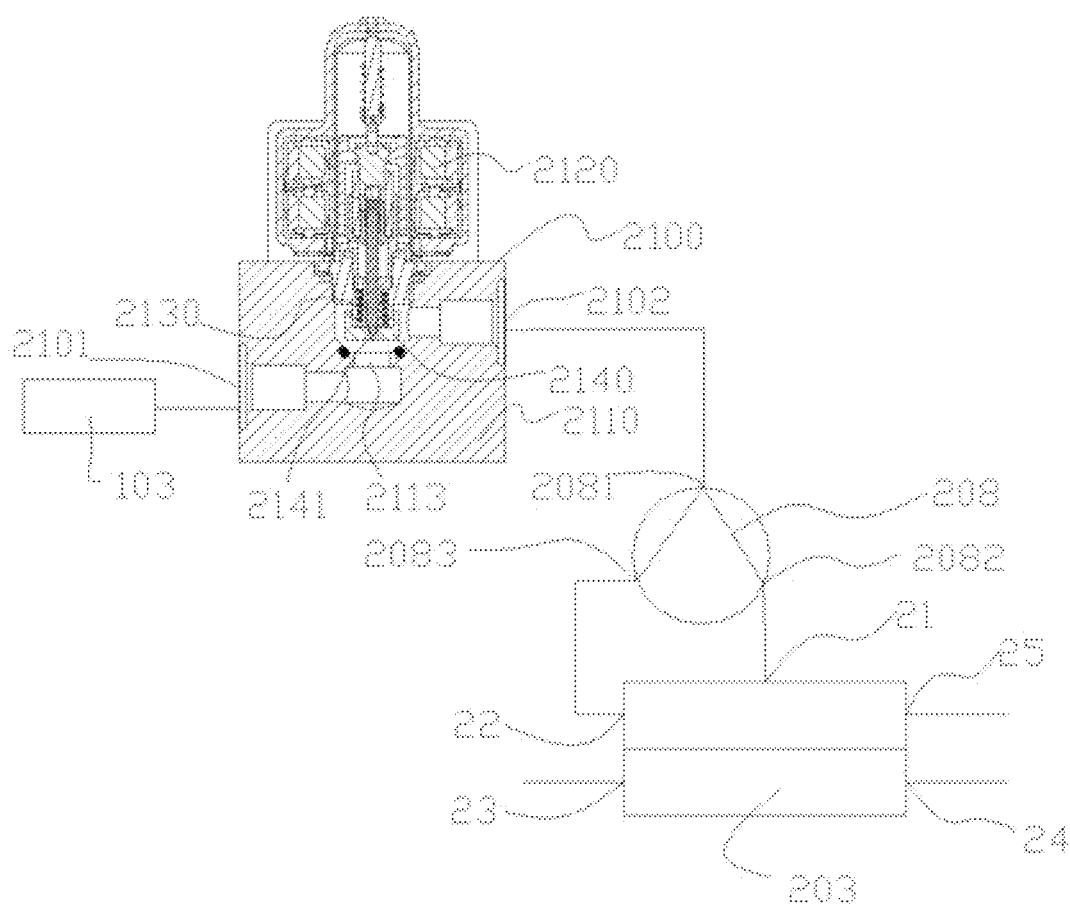
FIG. 23 is a schematic view showing a second connection arrangement of the intermediate heat exchanger, the fluid switching portion and the flow regulating portion.

For another example, referring to FIG. 23, the flow regulating portion includes a valve body 2110, the first connecting port 2101 and the second connecting port 2102 are arranged on the valve body 2110, wherein, in a case that the refrigerant enters the valve body from the second connecting port 2102 and is discharged from the first connecting port 2101, the flow regulating portion has a throttling function and a cut-off function. In a case that the refrigerant enters the valve body from the first connecting port 2101 and is discharged from the second connecting port 2102, the flow regulating portion has a communicating function. Specifically, the flow regulating portion includes a drive portion 2120, a valve core 2130 and a valve seat 2140, the valve body further includes a first valve port 2113, and the valve seat 2140 includes a second valve port 2141. In a case that the refrigerant enters the valve body from the second connecting port 2112 and is discharged from the first connecting port 2101, the valve seat 2140 is located in a first working position, the valve seat 2140 closes the first valve port 2113, and the drive portion 2120 drives the valve core 2130 to move with respect to the second valve port 2141. The valve core 2130 can open or close the second valve port 2141 or adjust the opening degree of the second valve port 2141. When the valve core 2130 closes the second valve port 2141, the valve core can cut off the communication passageway between the first connecting port 2101 and the second connecting port 2102. When the valve core 2130 adjusts the opening degree of the second valve port 2141, after the refrigerant enters the second connecting port 2102, the refrigerant is discharged out of the valve body 2110 from the first connecting port 2101 after being throttled in the valve body 2110. In a case that the refrigerant enters into valve body 2110 from the first connecting port 2101 and is discharged from the second connecting port 2102, the valve seat 2140 is located in a second working position, the valve seat 2140 opens the first valve port 2113, and the first connecting port 2111 is in communication with the second connecting port 2102 through the first valve port 2113.

Figure 20:
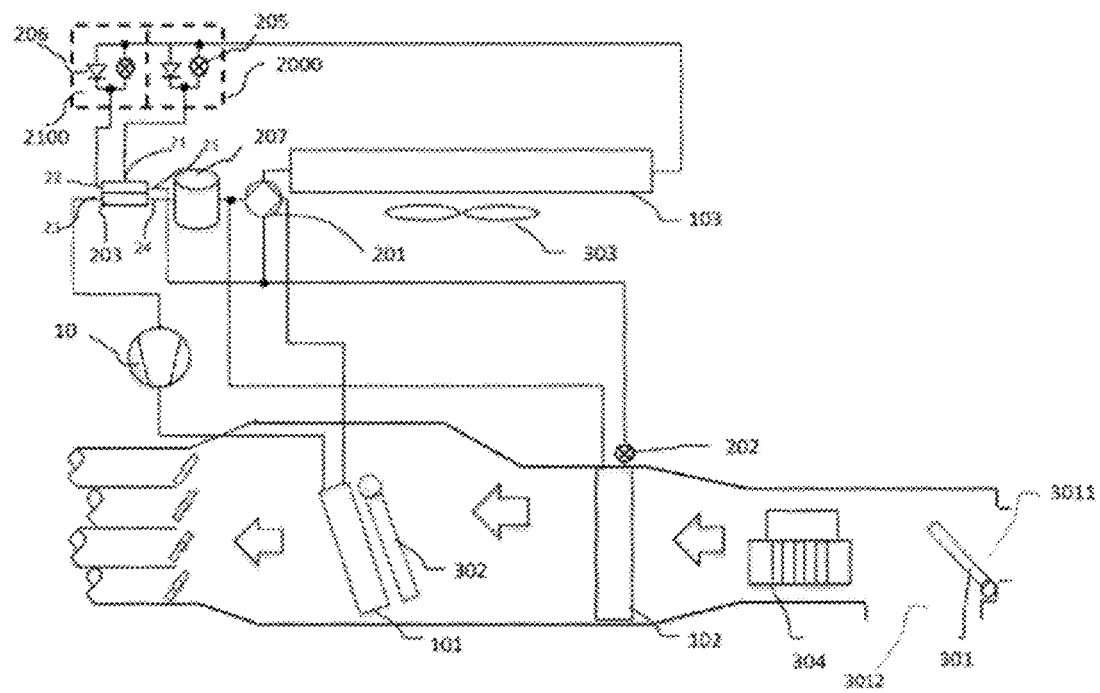
FIG. 20 is a schematic view of the thermal management system according to a fourth embodiment of the present application.

In another embodiment, referring to FIG. 20, the fluid control device 2000 includes two flow regulating portions 2100 which are connected in parallel. Each of the flow regulating portions 2100 includes the first connecting port 2101 and the second connecting port 2102, the first connecting ports 2101 of the two flow regulating portions are in communication with the first end port 1031 of the third heat exchanger 103, the second connecting port 2102 of one of the two flow regulating portions is in communication with the second end port 21 of the second heat exchange portion 30, and the second connecting port 2102 of the other flow regulating portion is in communication with the third end port 22 of the second heat exchange portion 30. When the thermal management system is working, if the flow regulating portions 2100 perform the throttling function, at least one throttling unit 205 throttles the refrigerant, and the valve units 206 are closed; and when the flow regulating portions 2100 are on, at least one valve unit 206 is on, and the throttling units 205 are closed. It is conceivable that the provided fluid control device 2000 includes the fluid switching portion 208, or includes flow regulating portions 2100 connected in parallel, which apparently makes the communication between the second end port 21 or the third end port 22 of the intermediate heat exchanger 203 and the intermediate heat exchanger 203 more flexible. In any operation mode, the fluid control device can be switched as required to perform partial or total heat exchange in the intermediate heat exchanger 203.

In addition, the connection or communication described in this specification may be direct connection or communication, for example, two parts may be assembled together, so that the connecting pipeline can be dispensed with and the system is more compact, or the connection or communication described in this specification may be indirect connection or communication, for example, two parts may be in communication with each other through a pipeline, or two parts may be in communication with each other through a certain part. No further examples will be described herein. In the technical solution of the present application, opening the throttling unit refers to that the opening degree of the throttling unit reaches the maximum magnitude, closing the throttling unit refers to that the opening degree of the throttling unit is zero, and switching on the throttling unit refers to that the throttling unit is in a state between opening and closing, or in other words, in a throttling state of the throttling unit.

Similarly, the thermal management system has a heating mode, a refrigerating mode, a first dry mode, and a second dry mode. The working conditions of the thermal management system under different modes are respectively illustrated hereinafter. When the ambient temperature is low and the passenger compartment needs heat to improve the comfort of passengers, the thermal management system enters the heating mode, and the thermal management system can adjust the fluid switching portion 208. For example, the fluid switching portion is adjusted, so that the first end port 2081 of the fluid switching portion is in communication with the second end port 2082 of the fluid switching portion, the first end port 2081 of the fluid switching portion 208 is cut off from the third end port 2083 of the fluid switching portion, and the second end port 21 of the second heat exchange portion 30 is in communication with the first end port 1031 of the third heat exchanger through the fluid control device 2000, or in other words, the refrigerant flowing through the first heat exchange portion 20 exchanges heat with a part of the refrigerant flowing through the second heat exchange portion 30, and at this time, the refrigerant flowing through the first flat tube of the first sub-portion exchanges heat with the refrigerant flowing through the corresponding second flat tube 32. The thermal management system may adjust the fluid switching portion 208, so that the first end port 2081 of the fluid switching portion 208 is in communication with the third end port 2083 of the fluid switching portion, and the first end port 2081 of the fluid switching portion is cut off from the second end port 2082 of the fluid switching portion. At this time, the third end port 22 of the second heat exchange portion 30 is in communication with the first end port 1031 of the third heat exchanger through the fluid control device. At this time, the refrigerant flowing through the first flat tube 31 of the first sub-portion exchanges heat with the refrigerant flowing through the corresponding second flat tube 32, and the refrigerant flowing through the first flat tube 31 of the second sub-portion exchanges heat with the refrigerant flowing through the corresponding second flat tube 32. The refrigerant discharged from the second heat exchange portion 30 becomes the lower temperature and high pressure liquid refrigerant, and the refrigerant flowing through the second heat exchange portion 30 exchanges heat with all the refrigerant flowing through the first heat exchange portion 20. Accordingly, the flow regulating portion is adjusted, so that the first connecting port is in communication with the second connecting port, the valve unit 206 is closed, and the throttling unit 205 is open. The low temperature and low pressure liquid refrigerant exchanges heat around the third heat exchanger 103 with the air around the heat exchanger and absorbs the heat of the air. The thermal management system is provided with the intermediate heat exchanger 203 and the fluid control device 2000. When the thermal management system is heating, the refrigerant flowing through the first heat exchange portion can either exchange heat with all or a part of the refrigerant flowing through the second heat exchange portion 30 according to the working conditions, which is conducive to meeting the heat exchange amount of the intermediate heat exchanger 203 required by the thermal management system and then to improving the performance of the thermal management system. In the refrigerating mode of the thermal management system, the fluid switching portion 208 is adjusted, for example, so that the first end port 2081 of the fluid switching portion is in communication with the second end port 2082 of the fluid switching portion, the first end port 2081 of the fluid switching portion is cut off from the third end port 2083 of the fluid switching portion, and the second end port 21 of the second heat exchange portion 30 is in communication with the first end port 1031 of the third heat exchanger through the fluid control device 2000, or the fluid switching portion 208 is adjusted so that the first end port 2081 of the fluid switching portion is in communication with the third end port 2083 of the fluid switching portion, and the first end port 2081 of the fluid switching portion is cut off from the second end port 2082 of the fluid switching portion. The thermal management system is provided with the intermediate heat exchanger 203 and the fluid control device 2000. When the thermal management system is refrigerating, the refrigerant flowing through the first heat exchange portion 20 can either exchange heat with all or a part of the refrigerant flowing through the second heat exchange portion 30 according to the working conditions, which is conducive to meeting the heat exchange amount of the intermediate heat exchanger 203 required by the thermal management system and then to improving the performance of the thermal management system.

The dry mode of the thermal management system includes the first dry mode and the second dry mode. In the first dry mode, the flow regulating portion is adjusted so that the first connecting port communicates with the second connecting port, the valve unit 206 is open, and the throttling unit 205 is closed. The fluid switching portion 208 is adjusted, for example, so that the first end port 2081 of the fluid switching portion is in communication with the second end port 2082 of the fluid switching portion, the first end port 2081 of the fluid switching portion is cut off from the third end port 2083 of the fluid switching portion, and the second end port of the second heat exchange portion 30 is in communication with the first end port of the third heat exchanger through the fluid control device 2000. The fluid switching portion 208 is adjusted, so that the first end port 2081 of the fluid switching portion is in communication with the third end port 2083 of the fluid switching portion, the first end port 2081 of the fluid switching portion is cut off from the second end port 2082 of the fluid switching portion, and at this time, the third end port of the second heat exchange portion 30 is in communication with the first end port of the third heat exchange through the fluid control device. It is conceivable that in the first dry mode, the thermal management system is provided with the intermediate heat exchanger 203 and the fluid control device 2000, and the refrigerant flowing through the first heat exchange portion 20 can either exchange heat with all or a part of the refrigerant flowing through the second heat exchange portion 30 according to the working conditions, which is conducive to meeting the heat exchange amount of the intermediate heat exchanger 203 required by the thermal management system and then to improving the performance of the thermal management system.

In the second dry mode, the fluid switching portion 208 is adjusted, for example, so that the first end port 2081 of the fluid switching portion is in communication with the second end port 2082 of the fluid switching portion, the first end port 2081 of the fluid switching portion is cut off from the third end port 2083 of the fluid switching portion, and the second end port of the second heat exchange portion 30 is in communication with the first end port 1031 of the third heat exchanger through the fluid control device 2000. The fluid switching portion is adjusted, so that the first end port 2081 of the fluid switching portion is in communication with the third end port 2083 of the fluid switching portion, the first end port 2081 of the fluid switching portion is cut off from the second end port 2082 of the fluid switching portion, and at this time, the third end port of the second heat exchange portion 30 is in communication with the first end port of the third heat exchanger through the fluid control device. The refrigerant discharged from the second heat exchange portion 30 becomes the lower temperature and high pressure liquid refrigerant, and the refrigerant flowing through the second heat exchange portion 30 exchanges heat with all the refrigerant flowing through the first heat exchange portion 20. In the second dry mode, the thermal management system is provided with the intermediate heat exchanger 203 and the fluid control device 2000. The refrigerant flowing through the first heat exchange portion 20 can either exchange heat with all or a part of the refrigerant flowing through the second heat exchange portion 30 according to the working conditions, which is conducive to meeting the heat exchange amount of the intermediate heat exchanger required by the thermal management system and then to improving the performance of the thermal management system.

The thermal management system is provided with the intermediate heat exchanger. The second heat exchange portion 30 of the intermediate heat exchanger includes the first end port, the second end port and the third end port. In the same operation mode of the thermal management system, the second end port of the second heat exchange portion 30 or the third end port of the second heat exchange portion 30 can communicate with the first end port of the third heat exchanger through the throttling unit, or in other words, the first end port of the third heat exchanger can communicate with the second end port of the second heat exchange portion 30 or the third end port of the second heat exchange portion 30 through the valve unit. The refrigerant flowing through the first heat exchange portion 20 can either exchange heat with all or a part of the refrigerant flowing through the second heat exchange portion 30, which can be selected by the fluid control device. This is conducive to meeting the heat exchange amount of the intermediate heat exchanger required by the thermal management system and then to improving the performance of the thermal management system.

It should be noted that, the description of the above embodiments is only used to illustrate the present application and is not intended to limit the technical solutions of the present application, such as the definitions of "front", "rear", "left", "right", "up", and "down". Although the present application is described in detail with reference to the above embodiments, it should be understood by those skilled in the art that, various combinations, modifications and equivalent substitutions can be made to the technical solutions of the present application, and all the technical solutions and improvements without departing from the spirit and scope of the present application fall within the scope of the appended claims of the present application.

The invention claimed is:

1. An intermediate heat exchanger comprising:
    a second heat exchange portion comprising a plurality of first flat tubes, a first collecting pipe and a second collecting pipe, the second collecting pipe defining a chamber with a first sub-chamber and a second sub-chamber, the first sub-chamber being not in communication with the second sub-chamber, the first flat tubes comprising a first sub-portion formed by a part thereof and a second sub-portion formed by the other part thereof, the first sub-chamber communicating with a chamber of the first collecting pipe through passageways of the first sub-portion, and the second sub-chamber communicating with the chambers of the first collecting pipe through passageways of the second sub-portion; and
    a first heat exchange portion comprising a plurality of second flat tubes, a third collecting pipe and a fourth collecting pipe, each of the second flat tubes defining a passageway communicating a chamber of the third collecting pipe to a chamber of the fourth collecting pipe;
    wherein a first end port of the second heat exchange portion is in communication with the first sub-chamber, a second end port of the second heat exchange portion is in communication with the chamber of the first collecting pipe, a third end port of the second heat exchange portion is in communication with the second sub-chamber, a first end port of the first heat exchange portion is in communication with the chamber of the third collecting pipe, and a second end port of the first heat exchange portion is in communication with the chamber of the fourth collecting pipe; and the first flat tube comprises a first bonding portion, and the second flat tube comprises a second bonding portion connecting to the first bonding portion.

2. The intermediate heat exchanger according to claim 1, wherein the first flat tube comprises a first connecting portion and a first bent portion, the first connecting portion connecting with the second collecting pipe or the first collecting pipe, the first bent portion connecting between the first connecting portion and the first bonding portion;

wherein the first bent portion is arc-shaped and folded from the first bonding portion to the first connecting portion, and the first connecting portion is not coplanar with the first bonding portion.

3. The intermediate heat exchanger according to claim 2, wherein an included angle is defined between the first bonding portion and the first bent portion, and the included angle range is from 0 degree to 90 degrees.

4. The intermediate heat exchanger according to claim 2, wherein a center line of the first bonding portion along the width direction thereof is perpendicular to a center line of the first connecting portion along the width direction thereof.

5. The intermediate heat exchanger according to claim 2, wherein the first flat tube comprises two said first bent portions disposed at two opposite sides of the first bonding portion along a length direction thereof and two said first connecting portions connecting with two said first bent portions, respectively; and each said first bent portion is connected between one said first connecting portion and said first bonding portion, the first bent portions are bent from the first bonding portion along two opposite directions, and the first bent portions are located at a same side of the first bonding portion along a width direction thereof.

6. The intermediate heat exchanger according to claim 5, wherein a bending radius of each first bent portion is less than half of the distance between two adjacent first flat tubes, the first bonding portion comprising two opposite ends each connecting with one said first bent portion;

the first bent portions located at two different ends of the first bonding portion are bent toward each other, the first connecting portions disposed at two different ends of the first bonding portion are parallel to each other; and wherein each first connecting portion is parallel to the first bonding portion.

7. The intermediate heat exchanger according to claim 1, wherein the first bonding portion comprises a first surface and a first bonding surface, the first surface and the first bonding surface are arranged on two opposite sides of the first bonding portion, wherein the second bonding portion is substantially a longitudinally long flat structure, the second bonding portion comprises a second bonding surface and a fourth surface, the second bonding surface is in direct or indirect connection with the first bonding surface, and the fourth surface and the second bonding surface are arranged on two opposite sides of the second flat tube.

8. A thermal management system, comprising a compressor, a first heat exchanger, a second heat exchanger, a third heat exchanger and the intermediate heat exchanger according to claim 1, wherein a first end port of the first heat exchange portion is in communication with an inlet of the compressor, a second end port of the first heat exchange portion is capable of communicating with a refrigerant outlet of the second heat exchanger and/or a second end port of the third heat exchanger, and a first end port of the second heat exchange portion is capable of communicating with a refrigerant outlet of the first heat exchanger or a refrigerant inlet of the second heat exchanger; the thermal management system further comprises a flow regulating portion which comprises a throttling unit and a valve unit, a first end port of the third heat exchanger is capable of communicating with a third end port of the second heat exchange portion through the valve unit, and a second end port of the second heat exchange portion is capable of communicating with the first end port of the third heat exchanger through the throttling unit; and an operation mode of the thermal management system comprises a heating mode and/or a first dry mode, and in at least one of the operation modes, the throttling unit opens a path between the first end port of the third heat exchanger and the second end port of the second heat exchange portion, or the throttling unit and the valve unit open a path between the first end port of the third heat exchanger and the second end port of the second heat exchange portion, the valve unit shuts off a path between the first end port of the third heat exchanger and the third end port of the second heat exchange portion, and a refrigerant flowing through the first heat exchange portion is capable of exchanging heat with a refrigerant flowing through a part of the second heat exchange portion.

9. The thermal management system according to claim 8, wherein in the heating mode, an outlet of the compressor is in communication with a refrigerant inlet of the first heat exchanger, the first end port of the second heat exchange portion is in communication with the refrigerant outlet of the first heat exchanger, the refrigerant flowing through the first heat exchanger releases heat around the first heat exchanger, the second end port of the second heat exchange portion is in communication with the first end port of the third heat exchanger through the throttling unit, the throttling unit is open, and a refrigerant flowing through the third heat exchanger is configured to absorb heat around the third heat exchanger; and/or, the thermal management system comprises a first throttling device arranged at the refrigerant inlet of the second heat exchanger; in the first dry mode of the thermal management system, the outlet of the compressor is in communication with the refrigerant inlet of the first heat exchanger, and the refrigerant flowing through the first heat exchanger is configured to release heat around the first heat exchanger; the refrigerant inlet of the second heat exchanger is in communication with the refrigerant outlet of the first heat exchanger through the first throttling device, the first end port of the second heat exchange portion is in communication with the refrigerant outlet of the first heat exchanger, and the second end port of the second heat exchange portion is in communication with the first end port of the third heat exchanger through the throttling unit; and the refrigerant outlet of the second heat exchanger is in communication with the second end port of the first heat exchange portion, the second end port of the third heat exchanger is in communication with the second end port of the first heat exchange portion, the throttling unit and the first throttling device are open, the refrigerant flowing through the second heat exchanger is capable of absorbing heat around the second heat exchanger, and the refrigerant flowing through the third heat exchanger is capable of absorbing heat around the third heat exchanger.

10. A thermal management system, comprising a compressor, a first heat exchanger, a second heat exchanger, a third heat exchanger and the intermediate heat exchanger according to claim 1, wherein a first end port of the first heat exchange portion is in communication with an inlet of the compressor, a second end port of the first heat exchange portion is capable of communicating with a refrigerant outlet of the second heat exchanger and/or with a second end port of the third heat exchanger, and a first end port of the second heat exchange portion is capable of communicating with the refrigerant outlet of the first heat exchanger or with a refrigerant inlet of the second heat exchanger;

the thermal management system further comprises a fluid control device, the first end port of the third heat exchanger is capable of communicating with the second end port of the second heat exchange portion through the fluid control device, or the first end port of the third heat exchanger is capable of communicating with the third end port of the second heat exchange portion through the fluid control device; in a case that the first end port of the third heat exchanger is in communication with the second end port of the second heat exchange portion, the first heat exchange portion is capable of exchanging heat with a part of the second heat exchange portion, and in a case that the first end port of the third heat exchanger is in communication with the third end port of the second heat exchange portion, the first heat exchange portion is capable of exchanging heat with the whole second heat exchange portion; and operation modes of the thermal management system comprise a heating mode, a refrigerating mode, a first dry mode and a second dry mode, and in at least one of the operation modes, the first end port of the third heat exchanger is capable of communicating with either the second end port of the second heat exchange portion or the third end port of the second heat exchange portion, which is selected by the fluid control device.

11. The thermal management system according to claim 10, wherein, the fluid control device comprises a flow regulating portion, the flow regulating portion comprises a first connecting port and a second connecting port, the first connecting port is in communication with the first end port of the third heat exchanger; and the flow regulating portion comprises a valve unit and a throttling unit, the first connecting port is capable of communicating with the second connecting port through the valve unit, and the second connecting port is capable of communicating with the first connecting port through the throttling unit.

12. The thermal management system according to claim 11, wherein, the fluid control device further comprises a fluid switching portion, a first end port of the fluid switching portion is capable of communicating with a second end port of the fluid switching portion or a third end port of the fluid switching portion, the flow regulating portion is connected with the fluid switching portion in series, the first end port of the fluid switching portion is in communication with the second connecting port, the second end port of the fluid switching portion is in communication with the second end port of the second heat exchange portion, and the third end port of the fluid switching portion is in communication with the third end port of the second heat exchange portion; or the fluid control device comprises two flow regulating portions which are connected in parallel, the first connecting ports of the two flow regulating portions are in communication with the first end port of the third heat exchanger, the second connecting port of one of the two flow regulating portions is in communication with the second end port of the second heat exchange portion, and the second connecting port of the other flow regulating portion is in communication with the third end port of the second heat exchange portion.

13. The thermal management system according to claim 12, wherein, the valve unit and the throttling unit are separately provided; the valve unit comprises two end ports, a first end port of the valve unit is capable of communicating with the second connecting port, a first end port of the throttling unit is capable communicating with the second connecting port, both a second end port of the throttling unit and a second end port of the valve unit are capable of communicating with the first connecting port; or the valve unit comprises three end ports, the first end port of the valve unit is capable of communicating with the first connecting port, the second end port of the valve unit is capable of communicating with the second connecting port, a third end port of the valve unit is capable of communicating with the second end port of the throttling unit, and the first end port of the throttling unit is capable of communicating with the second connecting port; or the valve unit and the throttling unit are integrally arranged, the flow regulating portion comprises a valve body, a valve core and a valve seat, the first connecting port and the second connecting port are arranged on the valve body, the valve body further comprises a first valve port, the valve seat comprises a second valve port, in a case that the valve seat is in a first working position, the valve seat closes the first valve port, and the valve core is movable with respect to the second valve port and is capable of opening or closing the second valve port or adjusting an opening degree of the second valve port, and the second connecting port is in communication with the first connecting port through the second valve port; and in a case that the valve seat is in a second working position, the valve seat opens the first valve port, and the first connecting port is capable of communicating with the second connecting port through the first valve port.

14. The thermal management system according to claim 8, wherein, the flow regulating portion comprises a first connecting port, a second connecting port and a third connecting port, the first connecting port is in communication with the first end port of the third heat exchanger, the second connecting port is in communication with the second end port of the second heat exchange portion, and the third connecting port is in communication with the third end port of the second heat exchange portion; and the first connecting port is in communication with the second connecting port through the throttling unit, and the first connecting port is in communication with the third connecting port through the valve unit.

15. The thermal management system according to claim 14, wherein, the valve unit and the throttling unit are separately provided; the valve unit comprises two end ports, a first end port of the valve unit is in communication with the third connecting port, a first end port of the throttling unit is in communication with the second connecting port, both a second end port of the throttling unit and a second end port of the valve unit are in communication with the first connecting port; or the valve unit comprises three end ports, the first end port of the valve unit is in communication with the first connecting port, the second end port of the valve unit is in communication with the third connecting port, a third end port of the valve unit is in communication with the second end port of the throttling unit, and the first end port of the throttling unit is in communication with the second connecting port; or the valve unit and the throttling unit are integrally arranged, the flow regulating portion comprises a valve body, and the first connecting port, the second connecting port and the third connecting port are arranged on the valve body.

16. The thermal management system according to claim 13, wherein, the thermal management system further comprises a gas-liquid separator, an outlet of the gas-liquid separator is in communication with the second end port of the first heat exchange portion, an inlet of the gas-liquid separator is capable of communicating with the second end port of the third heat exchanger and/or the refrigerant outlet of the second heat exchanger.

17. The thermal management system according to claim 16, wherein, the thermal management system further comprises a first valve device which comprises a first communicating port, a second communicating port, a third communicating port and a fourth communicating port, the first communicating port is in communication with the refrigerant outlet of the first heat exchanger, the fourth communicating port is in communication with the second end port of the first heat exchange portion or is in communication with the second end port of the first heat exchange portion through the gas-liquid separator, the second communicating port is capable of communicating with the refrigerant inlet of the second heat exchanger through the first throttling device, the second communicating port is capable of communicating with the first end port of the second heat exchange portion, and the third communicating port is in communication with the second end port of the third heat exchanger, and the first valve device comprises a first working state and a second working state; in the first working state of the first valve device, the first communicating port is in communication with the third communicating port, and a communication passageway between the fourth communicating port and the second communicating port is relatively blocked; and in the second working state of the first valve device, the first communicating port of the first valve device is in communication with the second communicating port, and the third communicating port is in communication with the fourth communicating port.

18. The thermal management system according to claim 17, wherein, the first valve device comprises a first fluid switching device which comprises a first inlet, a first valve hole, a second valve hole and a third valve hole, the first inlet is in communication with the first communicating port, the first valve hole is in communication with the third communicating port, the second valve hole is in communication with the fourth communicating port, the third valve hole is in communication with the second communicating port; in the first working state of the first valve device, a communication passageway between the first inlet of the first fluid switching device and the first valve hole is unblocked, a communication passageway between the second valve hole and the third valve hole is relatively blocked; and in the second working state of the first valve device, a communication passageway between the first inlet of the first fluid switching device and the third valve hole is unblocked, and a communication passageway between the first valve hole and the second valve hole is unblocked; or, the first valve device comprises a second fluid switching device and a first valve member, the second fluid switching device comprises a second inlet, a fourth valve hole, a fifth valve hole and a sixth valve hole, two end ports of the first valve member are respectively in communication with the sixth valve hole and the second communicating port, the fifth valve hole is in communication with the fourth communicating port, the fourth valve hole is in communication with the third communicating port, and the second inlet is in communication with the first communicating port; in the first working state of the first valve device, a communication passageway between a second inlet of the second fluid switching device and the fourth valve hole is unblocked, a communication passageway between the fifth valve hole and the sixth valve hole is unblocked, and the first valve device closes the first valve member; and in the second working state of the first valve device, a communication passageway between the second inlet of the second fluid switching device and the sixth valve hole is unblocked, a communication passageway between the fourth valve hole and the fifth valve hole is unblocked, and the first valve device opens the first valve member.

19. The thermal management system according to claim 16, wherein, the thermal management system comprises a first throttling device provided at the refrigerant inlet of the second heat exchanger; the thermal management system comprises a second valve device, the second valve device comprises a first valve module, a second valve module and a third valve module, a first end port of the first valve module is in communication with the outlet of the compressor, a first end port of the second valve module is in communication with the outlet of the compressor, a second end port of the first valve module is in communication with the refrigerant inlet of the first heat exchanger, a second end port of the second valve module is in communication with the second end port of the third heat exchanger, a first end port of the third valve module is in communication with the second end port of the third heat exchanger, and a second end port of the third valve module is in communication with the second end port of the second heat exchange portion; or the second valve device comprises a first three-way valve and the third valve module, a first connecting port of the first three-way valve is in communication with the outlet of the compressor, a second connecting port of the first three-way valve is in communication with the refrigerant inlet of the first heat exchanger, a third connecting port of the first three-way valve is in communication with the second end port of the third heat exchanger, the third connecting port is in communication with the first end port of the third valve module, the second end port of the third valve module is in communication with the refrigerant outlet of the second heat exchanger, and the second end port of the third valve module is in communication with the second end port of the second heat exchange portion; or the second valve device comprises a second three-way valve and the first valve module, a second connecting port of the second three-way valve, and the first end port of the first valve module are in communication with the outlet of the compressor, the second end port of the first valve module is in communication with the refrigerant inlet of the first heat exchanger, a first connecting port of the second three-way valve is in communication with the second end port of the third heat exchanger, a third connecting port of the second three-way valve is in communication with the refrigerant outlet of the second heat exchanger, and the third connecting port of the second three-way valve is in communication with the second end port of the second heat exchange portion.

20. The thermal management system according to claim 17, wherein, the thermal management system further has a refrigerating mode, in the refrigerating mode of the thermal management system, the outlet of the compressor is in communication with the second end port of the third heat exchanger or is in communication with the second end port of the third heat exchanger through the first heat exchanger, the refrigerant flowing through the third heat exchanger releases heat around the third heat exchanger, and the valve unit causes a passageway between the first end port of the third heat exchanger and the third end port of the second heat exchange portion to be unblocked, the valve unit and/or the throttling unit cause the passageway between the first end port of the third heat exchanger and the second end port of the second heat exchange portion to be blocked, the first end port of the second heat exchange portion is in communication with the refrigerant inlet of the second heat exchanger through the first throttling device, the first throttling device is open, the refrigerant outlet of the second heat exchanger is in communication with the second end port of the first heat exchange portion, and the refrigerant flowing through the second heat exchanger is capable of absorbing heat around the second heat exchanger.

* * * * *